US012688011B2

(12) United States Patent
Marukame et al.

(10) Patent No.: US 12,688,011 B2
(45) Date of Patent: Jul. 21, 2026

(54) MULTIPLICATION DEVICE, MULTIPLY-ACCUMULATE OPERATION DEVICE, MATRIX OPERATION DEVICE, AND RESERVOIR DEVICE

(71) Applicant: KABUSHIKI KAISHA TOSHIBA, Tokyo (JP)

(72) Inventors: Takao Marukame, Tokyo (JP); Koichi Mizushima, Kamakura Kanagawa (JP); Yoshifumi Nishi, Yokohama Kanagawa (JP); Kumiko Nomura, Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 1010 days.

(21) Appl. No.: 17/820,224

(22) Filed: Aug. 16, 2022

(65) Prior Publication Data

US 2023/0305806 A1 Sep. 28, 2023

(30) Foreign Application Priority Data

Mar. 22, 2022 (JP) ................................. 2022-046012

(51) Int. Cl.
*G06F 7/544* (2006.01)
*G06F 17/16* (2006.01)
(52) U.S. Cl.
CPC ............ *G06F 7/5443* (2013.01); *G06F 17/16* (2013.01)
(58) Field of Classification Search
CPC .......... G06F 7/5443; G06F 17/16; G06G 7/16
See application file for complete search history.

(56) References Cited

U.S. PATENT DOCUMENTS

| 10,340,002 | B1 | 7/2019 | Kim et al. | |
| 2005/0160130 | A1* | 7/2005 | Korekado | G06F 7/5443 |
| | | | | 708/801 |

(Continued)

FOREIGN PATENT DOCUMENTS

| JP | 2009-157600 A | 7/2009 |
| JP | 2019-57343 A | 4/2019 |

(Continued)

OTHER PUBLICATIONS

Seyoung Kim et al., "Analog CMOS-based Resistive Processing Unit for Deep Neural Network Training," 2017 IEEE 60th International Midwest Symposium on Circuits and Systems (MWSCAS), pp. 422-425 (2017).

(Continued)

*Primary Examiner* — Carlo Waje
(74) *Attorney, Agent, or Firm* — Finnegan, Henderson, Farabow, Garrett & Dunner, LLP

(57) ABSTRACT

A multiplication device according to one embodiment includes a short-term memory circuit, a long-term memory circuit, a conversion circuit, and a control circuit. The short-term memory circuit generates a first control voltage in accordance with a weight value. The long-term memory circuit generates a second control voltage by a circuit with a larger time constant than the short-term memory circuit. The conversion circuit outputs an output current by multiplying an input voltage by a conductance. The output current is output by that, the first control voltage is applied to a control terminal of the conversion circuit, and an input voltage according to an input value is applied to an input terminal of the conversion circuit. The control circuit executes a calibration process of matching the first control voltage with the second control voltage by transferring an (Continued)

electric charge from the long-term memory circuit to the short-term memory circuit.

17 Claims, 11 Drawing Sheets

(56) References Cited

U.S. PATENT DOCUMENTS

| | | |
|---|---|---|
| 2019/0088301 A1 | 3/2019 | Maekawa |
| 2019/0318239 A1 | 10/2019 | Kim et al. |
| 2025/0004720 A1* | 1/2025 | Gutta ..................... G06F 7/523 |

FOREIGN PATENT DOCUMENTS

| | | |
|---|---|---|
| WO | WO 2018/207050 A1 | 11/2018 |
| WO | WO 2021/003147 A1 | 1/2021 |

OTHER PUBLICATIONS

Stefano Ambrogio et al., "Equivalent-accuracy accelerated neural-network training using analogue memory," Nature, vol. 558, 17 pages (2018).
Japan Patent Office, Office Action in JP App. No. 2022-046012, 1 page, with machine translation, 2 pages (Jan. 21, 2025).

\* cited by examiner

FIG.9

MULTIPLICATION DEVICE, MULTIPLY-ACCUMULATE OPERATION DEVICE, MATRIX OPERATION DEVICE, AND RESERVOIR DEVICE

CROSS-REFERENCE TO RELATED APPLICATIONS

This application is based upon and claims the benefit of priority from Japanese Patent Application No. 2022-046012, filed on Mar. 22, 2022; the entire contents of which are incorporated herein by reference.

FIELD

Embodiments described herein relate generally to a multiplication device, a multiply-accumulate operation device, a matrix operation device, and a reservoir device.

BACKGROUND

Artificial Intelligence (AI) has been used for automating and saving labor in various ways. A neural network is known as a typical AI algorithm. A deep neural network (DNN) obtained by multi-layering a neural network is used in a deep learning algorithm. A recurrent neural network (RNN) in which recurrent connection from neurons closer to an output toward neurons closer to an input is carried out is also used for time-series data processing. A long-short-term memory (LSTM) is also known as a neural network with enhanced short-term and long-term memory representation capabilities. The LSTM is even more applicable to time-series data processing.

In the RNN and the LSTM used for the time-series data processing, a calculation is carried out by using a central processing unit (CPU) serving as a general-purpose arithmetic operator. However, the RNN and the LSTM are often operated on a general purpose graphical processing unit (GP-GPU) since the RNN and the LSTM require the operation amount as compared with the NN and the DNN. The operation amount in the RNN and the LSTM even more increases during learning. As a result, large amounts of time and power consumption are required for learning. Therefore, elaborate parameter tuning is required for the deep learning, the RNN, and the LSTM during learning to achieve high performance.

By contrast, reservoir computing is known as an algorithm for time-series data processing, which requires less operation amount during learning. Reservoir computing does not require learning a reservoir unit. However, reservoir computing requires a high degree of precision in the weights between the reservoir unit and an output unit in order to output a desired signal. The reservoir unit is not limited to an electronic circuit, and is also known to be made by using various media. Since an output signal from the reservoir unit is generally an analog signal, the operation of the weights between the reservoir unit and the output unit can be implemented with a multiply-accumulate operator using an analog circuit.

Not only in the reservoir computing, but, in general, the higher the precision in the weights, the more desirable it is. However, it is technically difficult to provide an operator that can operate at high speed while maintaining sufficiently high precision in the weights.

BRIEF DESCRIPTION OF THE DRAWINGS

FIG. 9 is a diagram illustrating a configuration of a matrix operation device according to a fourth embodiment;

DETAILED DESCRIPTION

A multiplication device according to one embodiment is a multiplication device outputting an output value obtained by multiplying an input value by a weight value. The multiplication device includes a short-term memory circuit, a long-term memory circuit, a conversion circuit, and a control circuit. The short-term memory circuit is configured to hold an electric charge and generate a first control voltage in accordance with the weight value by the held electric charge. The long-term memory circuit is configured to generate a second control voltage in accordance with the weight value by a circuit with a larger time constant than a time constant of the short-term memory circuit. The conversion circuit includes an input terminal, an output terminal, and a control terminal. The conversion circuit is configured to change a conductance in accordance with a voltage applied to the control terminal and output, from the output terminal, a current obtained by multiplying a voltage applied to the input terminal by the conductance. The conversion circuit outputs, from the output terminal, an output current as the output value obtained by multiplying an input voltage by the conductance. The output current is output by that, the first control voltage generated by the short-term memory circuit is applied to the control terminal, and the input voltage according to the input value is applied to the input terminal. The control circuit is configured to execute a calibration process of matching the first control voltage generated by the short-term memory circuit with the second control voltage generated by the long-term memory circuit. The calibration process is executed by transferring an electric charge from the long-term memory circuit to the short-term memory circuit.

Hereinafter, embodiments will be described with reference to the drawings.

First Embodiment

Figure 1:
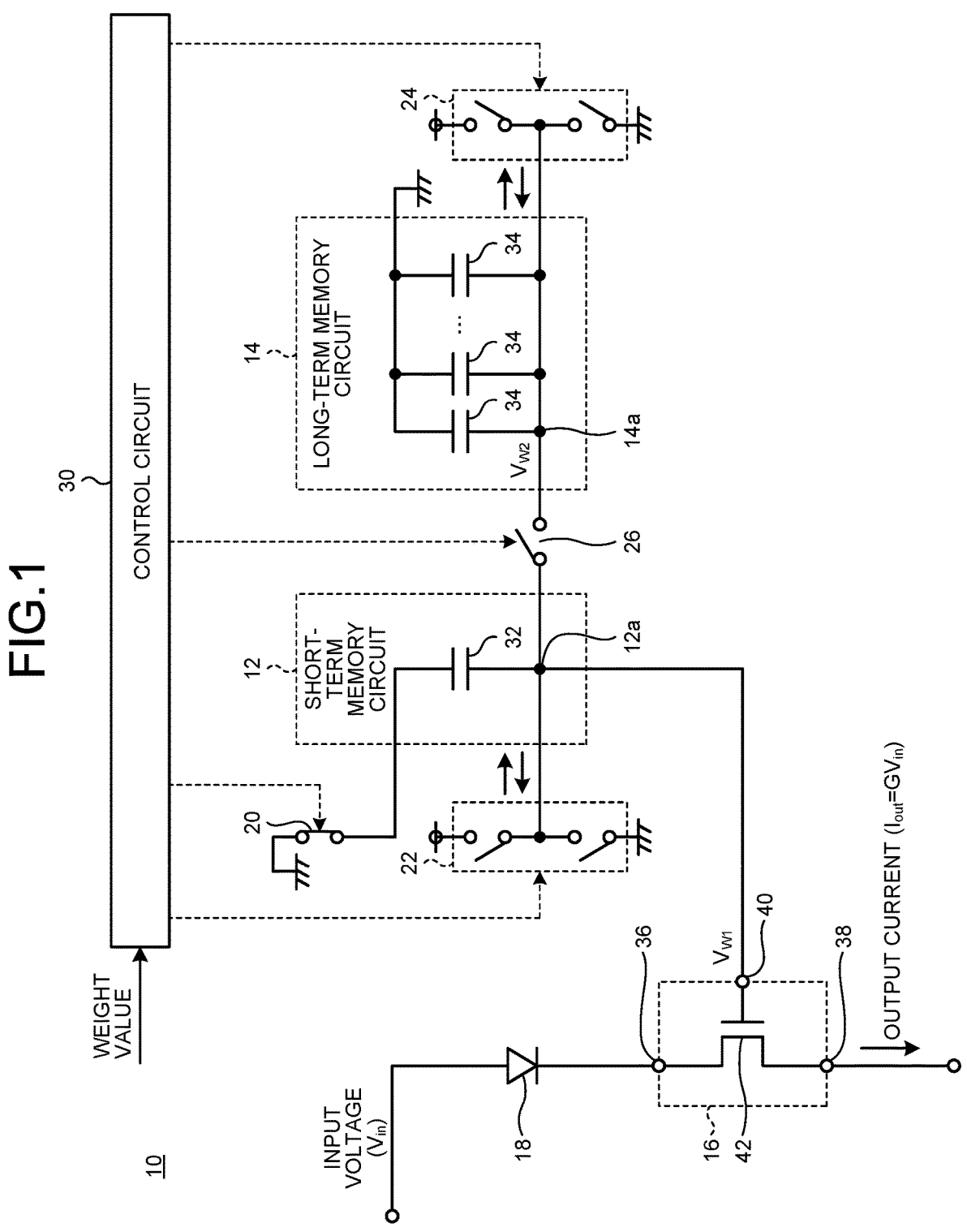
FIG. 1 is a diagram illustrating a configuration of a multiplication device according to a first embodiment.

FIG. 1 is a diagram illustrating a configuration of a multiplication device 10 according to a first embodiment. The multiplication device 10 outputs an output value obtained by multiplying an input value by a weight value. In the present embodiment, the input value, the weight value, and the output value are continuous values within a predetermined range. For example, the input value, the weight value, and the output value may be continuous values of 0 through 1, both inclusive. At least one of the input value and the weight value may be a binary value of 0 or 1, or may be a digital value with a predetermined number of bits.

The multiplication device 10 receives an input voltage ($V_{in}$) according to the input value. In the multiplication device 10, a conductance (G) is set in accordance with the weight value. The conductance (G) is a voltage-current conversion factor. The multiplication device 10 outputs an output current ($I_{out}=G\times V_{in}$) obtained by multiplying the input voltage ($V_{in}$) by the conductance (G), as the output value.

The multiplication device 10 includes a short-term memory circuit 12, a long-term memory circuit 14, a conversion circuit 16, a rectifier circuit 18, a reference potential switch 20, an adjustment switch 22, a setting switch 24, a calibration switch 26, and a control circuit 30.

The short-term memory circuit 12 holds an electric charge. The short-term memory circuit 12 generates a first control voltage ($V_{W1}$) in accordance with a weight value by the held electric charge. In this example, the short-term memory circuit 12 generates the first control voltage ($V_{W1}$) from a first terminal 12a. In the short-term memory circuit 12, a terminal opposite to the first terminal 12a is connected to ground potential through the reference potential switch 20.

The short-term memory circuit 12 is a circuit with a predetermined time constant. The short-term memory circuit 12 causes the held electric charge to decrease over time. The time constant of the short-term memory circuit 12 depends on elements and circuit configurations for implementing the short-term memory circuit 12. That is, a decreasing curve of a voltage in the short-term memory circuit 12 depends on the elements and the circuit configurations for implementing the short-term memory circuit 12. In the present embodiment, the short-term memory circuit 12 includes a short-term memory capacitor 32 that is a capacitor having a predetermined capacity.

The short-term memory circuit 12 preferably has a small capacity. With this configuration, the target amount of electric charges can be stored in the short-term memory circuit 12 in a short period of time. The capacity of the short-term memory circuit 12 is larger than at least parasitic capacity of wiring and gate capacity of a transistor. The short-term memory circuit 12 can simply and precisely control the amount of electric charges to be stored by the amount of current and the charge time or discharge time. In the short-term memory circuit 12, a linear relationship between the amount of stored electric charges and the generated voltage is established by the relationship of Q=CV. With this configuration, the short-term memory circuit 12 can simply and precisely control the generated voltage.

The long-term memory circuit 14 generates a second control voltage ($V_{W2}$) in accordance with a weight value by a circuit with a larger time constant than the time constant of the short-term memory circuit 12. In this example, the long-term memory circuit 14 generates the second control voltage ($V_{W2}$) from a second terminal 14a. In the long-term memory circuit 14, a terminal opposite to the second terminal 14a is connected to ground potential.

The long-term memory circuit 14 is a circuit with a larger time constant than the time constant of the short-term memory circuit 12, so that a voltage decreases at a slower rate than that of the short-term memory circuit 12 or hardly decreases at all over time. For example, the long-term memory circuit 14 holds an electric charge by a circuit with a larger time constant than the time constant of the short-term memory circuit 12. In the present embodiment, the long-term memory circuit 14 includes a long-term memory capacitor 34 that is a capacitor having a predetermined capacity. The long-term memory capacitor 34 has a larger capacity than the short-term memory capacitor 32 does, included in the short-term memory circuit 12. The long-term memory capacitor 34 may be, for example, a capacitor with a large area, or may have a configuration in which two or more capacitors having small areas are connected in parallel.

The long-term memory circuit 14 is composed of capacitors, and can be mounted in a semiconductor device or the like, by using the same manufacturing method as that of the short-term memory circuit 12. Therefore, the long-term memory circuit 14 can be composed of capacitors to improve the manufacturing efficiency of the multiplication device 10. When composed of capacitors, the long-term memory circuit 14 can simply and precisely control a voltage generated because a linear relationship between the amount of stored electric charges and the generated voltage is established by the relationship of Q=CV.

The conversion circuit 16 includes an input terminal 36, an output terminal 38, and a control terminal 40. The conversion circuit 16 changes the conductance (G) between the input terminal 36 and the output terminal 38 in accordance with a voltage applied to the control terminal 40. The conversion circuit 16 then causes the output terminal 38 to output a current obtained by multiplying a voltage applied to the input terminal 36 by the conductance (G). In the present embodiment, the conversion circuit 16 is a field-effect transistor 42. The field-effect transistor 42 includes a gate corresponding to the control terminal 40. The field-effect transistor 42 includes a drain and a source, and one of the drain and the source corresponds to the input terminal 36, and the other of the drain and the source, which is not the input terminal 36, corresponds to the output terminal 38.

The conversion circuit 16 can change the conductance (G) with a resolution that represents weight values, which are continuous values, with sufficient precision. For example, the conversion circuit 16 can change the conductance (G) in 256 gradations (for example, 8-bit precision).

In the conversion circuit 16, the first control voltage ($V_{W1}$) generated by the short-term memory circuit 12 is applied to the control terminal 40 when the operation is performed. In addition, in the conversion circuit 16, an input voltage ($V_{in}$) according to the input value is applied to the input terminal 36. Moreover, in the conversion circuit 16, the output terminal 38 outputs an output current ($I_{out}=G\times V_{in}$) obtained by multiplying the input voltage ($V_{in}$) by the conductance (G). That is, the conversion circuit 16 causes the output terminal 38 to output the output current ($I_{out}$) according to the output value obtained by multiplying the input value by the weight value.

The conversion circuit 16 can be formed of one field-effect transistor 42, so that it is possible to reduce an occupied area of the conversion circuit 16 when it is installed in a semiconductor device. Therefore, the multiplication device 10 including the conversion circuit 16 can be mounted in a semiconductor device at high density, and can be easily incorporated into a device that performs a large number of multiplication operations in parallel.

The rectifier circuit 18 allows an output current to flow in a first direction in the conversion circuit 16 and blocks a current in a direction opposite to the first direction. In this example, the rectifier circuit 18 allows a current to flow in a direction from the input terminal 36 to the output terminal 38 and blocks a current from the output terminal 38 to the input terminal 36. A negative input voltage ($V_{in}$) is applied to the rectifier circuit 18, and in a case where a negative output current ($I_{out}$) is output, the rectifier circuit 18 allows a current to flow in the direction from the output terminal 38 to the input terminal 36 and blocks a current in the direction from the input terminal 36 to the output terminal 38. The rectifier circuit 18 is, for example, a diode. The rectifier circuit 18 can prevent a reverse current that flows from another circuit to the conversion circuit 16.

The reference potential switch 20 short-circuits or disconnects a terminal from the ground potential, in which the terminal is disposed opposite to the first terminal 12a that generates the first control voltage ($V_{W1}$) in the short-term memory circuit 12. The reference potential switch 20 is controlled by the control circuit 30. The reference potential switch 20 is short-circuited during the operation of the multiplication device 10 and disconnected during a period of time when the multiplication device 10 is not in operation.

In the adjustment, the adjustment switch 22 connects the first terminal 12a in the short-term memory circuit 12, at which the first control voltage ($V_{W1}$) is obtained, to the ground potential or power supply potential to charge the short-term memory circuit 12 with an electric charge or make the short-term memory circuit 12 discharge the electric charge. The adjustment switch 22 is controlled by the control circuit 30. In a case where the short-term memory circuit 12 is charged with an electric charge, the control circuit 30 controls the adjustment switch 22 to connect the first terminal 12a to the power supply potential. In a case where the electric charge is discharged from the short-term memory circuit 12, the control circuit 30 controls the adjustment switch 22 to connect the first terminal 12a to the ground potential. The control circuit 30 controls the adjustment switch 22 to disconnect the first terminal 12a from both the power supply potential and ground potential during a period at the non-adjustment time.

The setting switch 24 connects the second terminal 14a that generates the second control voltage ($V_{W2}$) in the long-term memory circuit 14 to the ground potential or power supply potential to charge the long-term memory circuit 14 with an electric charge or make the long-term memory circuit 14 discharge the electric charge during setting. The setting switch 24 is controlled by the control circuit 30. In a case where the long-term memory circuit 14 is charged with an electric charge, the control circuit 30 controls the setting switch 24 to connect the second terminal 14a to the power supply potential. In a case where the electric charge is discharged from the long-term memory circuit 14, the control circuit 30 controls the setting switch 24 to connect the second terminal 14a to the ground potential. The control circuit 30 controls the setting switch 24 to disconnect the first terminal 12a from both the power supply potential and ground potential during a period at the non-setting time.

The calibration switch 26 connects the short-term memory circuit 12 to the long-term memory circuit 14 during calibration to allow an electric charge to be transferred from the long-term memory circuit 14 to the short-term memory circuit 12. The calibration switch 26 is controlled by the control circuit 30. For example, the control circuit 30 controls the calibration switch 26 to connect the first terminal 12a of the short-term memory circuit 12 to the second terminal 14a of the long-term memory circuit 14 during the calibration. The control circuit 30 controls the calibration switch 26 to disconnect the short-term memory circuit 12 from the long-term memory circuit 14 during a period at the non-calibration time.

The control circuit 30 controls the entire operation of the multiplication device 10. For example, the control circuit 30 is a processor, a field-programmable gate array (FPGA), or the like.

At the adjustment time, the control circuit 30 receives a weight value. The control circuit 30 then executes an adjustment process. In the adjustment process, the control circuit 30 causes storage of electric charges in an electric charge amount for generating the first control voltage ($V_{W1}$) according to a weight value in the short-term memory circuit 12 by controlling the adjustment switch 22 to charge the short-term memory circuit 12 with electric charges or make the short-term memory circuit 12 discharge the electric charges. For example, the control circuit 30 has a function, a table, or the like that represents a corresponding relationship between a weight value and the first control voltage ($V_{W1}$), and causes the short-term memory circuit 12 to generate the first control voltage ($V_{W1}$) according to the weight value with reference to the function, the table, or the like. The control circuit 30 may cause the short-term memory circuit 12 to generate a desired first control voltage ($V_{W1}$) by, for example, controlling a charge time or a discharge time, or to generate a desired first control voltage ($V_{W1}$) by measuring a voltage at the first terminal 12a of the short-term memory circuit 12.

The time constant of the short-term memory circuit 12 is relatively small, so that the short-term memory circuit 12 is able to generate the first control voltage ($V_{W1}$) according to the weight value with a small amount of electric charges. Therefore, the control circuit 30 can cause the short-term memory circuit 12 to generate the first control voltage ($V_{W1}$) according to the weight value in a short time with high precision.

After the adjustment process, the control circuit 30 executes a setting process during the setting. In the setting process, the control circuit 30 matches the second control voltage ($V_{W2}$) generated by the long-term memory circuit 14 with the first control voltage ($V_{W1}$) generated by the short-term memory circuit 12. With this configuration, the long-term memory circuit 14 can generate the second control voltage ($V_{W2}$) according to the weight value. For example, the control circuit 30 detects the first control voltage ($V_{W1}$) generated by the short-term memory circuit 12 after the adjustment process. The control circuit 30 causes storage of electric charges in an electric charge amount for generating the second control voltage ($V_{W2}$) equal to the detected first control voltage ($V_{W1}$) on the long-term memory circuit 14, by controlling the setting switch 24 to charge the long-term memory circuit 14 with electric charges or make the long-term memory circuit 14 discharge the electric charges.

In the long-term memory circuit 14, a voltage drop amount per hour is small since a time constant is relatively large. Therefore, the control circuit 30 can continuously generate the second control voltage ($V_{W2}$) according to the weight value in a long time with high precision.

In the control circuit 30, the first control voltage ($V_{W1}$) generated by the short-term memory circuit 12 is applied to the control terminal 40 of the conversion circuit 16 during the operation. That is, during the operation, in the control circuit 30, the conductance (G) according to the weight value is made between the input terminal 36 and the output terminal 38 in the conversion circuit 16. With this configuration, during the operation, the conversion circuit 16 outputs the output current ($I_{out}=G{\times}V_{in}$) obtained by multiplying the input voltage ($V_{in}$) according to the input value by the conductance (G) according to the weight value.

During the calibration, the control circuit 30 executes a calibration process. In the calibration process, the control circuit 30 matches the first control voltage ($V_{W1}$) generated by the short-term memory circuit 12 with the second control voltage ($V_{W2}$) generated by the long-term memory circuit 14 by transferring an electric charge from the long-term memory circuit 14 to the short-term memory circuit 12. For example, the control circuit 30 controls the calibration switch 26 to connect the short-term memory circuit 12 and the long-term memory circuit 14 to each other, so that an electric charge is transferred from the long-term memory circuit 14 to the short-term memory circuit 12. With this configuration, even in a case where the stored electric charges decrease, the short-term memory circuit 12 can generate the first control voltage ($V_{W1}$) according to the weight value in a long time with high precision since the electric charges are supplemented from the long-term memory circuit 14. In the long-term memory circuit 14, a voltage drop amount is extremely small with respect to a reduction amount of the electric charge since a time constant is larger than that of the short-term memory circuit 12. Therefore, the long-term memory circuit 14 can generate the second control voltage ($V_{W2}$) with high precision even after the electric charge is transferred to the short-term memory circuit 12.

The control circuit 30 executes the calibration process at each predetermined time interval or every time when a predetermined event occurs. The predetermined event may be, for example, an event that occurs in a case where the voltage drop amount of the first control voltage ($V_{W1}$) generated by the short-term memory circuit 12 is equal to or greater than a predetermined value or a predetermined percentage. The predetermined event may be, for example, an event that occurs in a case where an arithmetic operation of the multiplication device 10 is stopped, an event that occurs in a case where a predetermined time is reached, or an event that occurs in a case where an instruction to start calibration, or the like is received from an external device.

Figure 2:
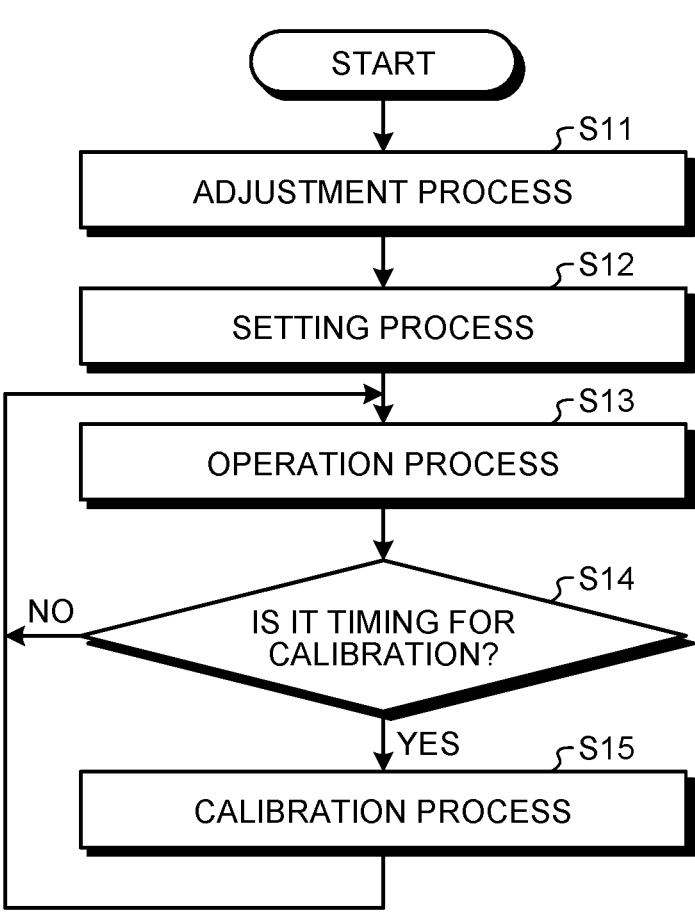
FIG. 2 is a flowchart illustrating a processing flow of a control circuit.

FIG. 2 is a flowchart illustrating a processing flow of the control circuit 30. As an example, the control circuit 30 executes processes in the flow illustrated in FIG. 2.

First, at S11, the control circuit 30 executes the adjustment process. Specifically, the control circuit 30 receives a weight value. The control circuit 30 causes storage of electric charges in an electric charge amount for generating the first control voltage ($V_{W1}$) according to the received weight value in the short-term memory circuit 12 by controlling the adjustment switch 22. Therefore, the control circuit 30 can cause the short-term memory circuit 12 to generate the first control voltage ($V_{W1}$) according to the weight value.

Subsequently, at S12, the control circuit 30 executes the setting process. Specifically, the control circuit 30 matches the second control voltage ($V_{W2}$) generated by the long-term memory circuit 14 with the first control voltage ($V_{W1}$) generated by the short-term memory circuit 12. For example, the control circuit 30 controls the setting switch 24 while comparing the first control voltage ($V_{W1}$) with a voltage generated by the long-term memory circuit 14 to cause storage of electric charges in an electric charge amount for generating the second control voltage ($V_{W2}$) equal to the first control voltage ($V_{W1}$) in the long-term memory circuit 14. Therefore, the control circuit 30 can cause the long-term memory circuit 14 to generate the second control voltage ($V_{W2}$) according to the weight value.

Subsequently, at S13, the control circuit 30 causes the conversion circuit 16 to execute an operation process. Specifically, the control circuit 30 causes all the adjustment switch 22, the setting switch 24, and the calibration switch 26 to be turned off, thereby applying the first control voltage ($V_{W1}$) generated by the short-term memory circuit 12 to the control terminal 40 of the conversion circuit 16. With this configuration, in the conversion circuit 16, the conductance (G) according to the weight value is made between the input terminal 36 and the output terminal 38. The control circuit 30 causes the input voltage (V) according to the input value to be applied to the input terminal 36 of the conversion circuit 16. With this configuration, the conversion circuit 16 can output, from the output terminal 38, the output current ($I_{out}=G \times V_{in}$) obtained by multiplying the input voltage ($V_{in}$) by the conductance (G).

The control circuit 30 keeps causing the first control voltage ($V_{W1}$) generated by the short-term memory circuit 12 to be applied to the control terminal 40 of the conversion circuit 16, and causes the output current ($I_{out}$) to be output at each time when the input voltage ($V_{in}$) is applied to the conversion circuit 16. With this configuration, the control circuit 30 can cause the conversion circuit 16 to execute a multiplication process of multiplying a time-series input voltage ($V_{in}$) representing a time-series input value by a weight value to output a time-series output current ($I_{out}$) representing a time-series output value.

Subsequently, at S14, the control circuit 30 determines whether it is timing for calibration. The calibration timing is, for example, a timing that comes at predetermined time interval or at a time when a predetermined event occurs. In a case where the calibration timing has not been reached (No at S14), the control circuit 30 returns the process to S13 and keeps causing the conversion circuit 16 to execute the operation process. In a case where the calibration timing is reached (Yes at S14), the control circuit 30 causes the process to proceed to S15.

At S15, the control circuit 30 executes the calibration process. Specifically, the control circuit 30 matches the first control voltage ($V_{W1}$) generated by the short-term memory circuit 12 with the second control voltage ($V_{W2}$) generated by the long-term memory circuit 14. In this case, the control circuit 30 connects, by the calibration switch 26, the long-term memory circuit 14 to the short-term memory circuit 12 to transfer an electric charge from the long-term memory circuit 14 to the short-term memory circuit 12, thereby matching the first control voltage ($V_{W1}$) generated by the short-term memory circuit 12 with the second control voltage ($V_{W2}$) generated by the long-term memory circuit 14.

In the case where the process at S15 ends, the control circuit 30 returns the process to S13 and keeps causing the conversion circuit 16 to execute the operation process. The control circuit 30 may receive a new weight value during the execution of S13. In this case, the control circuit 30 returns the process to S11 and repeats the processes from S11. In the case where the control circuit 30 receives a new weight value during the execution of S13, the control circuit 30 may proceed to the operation process at S13 without executing the setting process of S12. In this case, the control circuit 30 executes the setting process at S12 after the operation process ends or is interrupted. With this configuration, the control circuit 30 can execute the setting process after the weight value is determined in a case where the weight value is updated multiple times by a learning process or the like.

The multiplication device 10 as described above can apply the first control voltage ($V_{W1}$) according to the weight value to the control terminal 40 of the conversion circuit 16 to cause the conversion circuit 16 to output the output current ($I_{out}$) obtained by multiplying the input voltage ($V_{in}$) according to the input value by the conductance (G) according to the weight value. With this configuration, the multiplication device 10 can execute a multiplication process with a high resolution and high precision, with a very simple configuration.

Moreover, the multiplication device 10 holds an electric charge in the short-term memory circuit 12 to generate the first control voltage ($V_{W1}$) according to the weight value. The short-term memory circuit 12 can generate the first control voltage ($V_{W1}$) according to the weight value with a small amount of electric charges since the time constant is relatively small. Therefore, the multiplication device 10 can generate the first control voltage ($V_{W1}$) according to the weight value in a short time with high precision. Thus, the multiplication device 10 can efficiently change the weight value in a short time.

The multiplication device 10 causes the short-term memory circuit 12 to generate the first control voltage ($V_{W1}$) in accordance with the weight value, and then causes the long-term memory circuit 14 to generate the second control voltage ($V_{W2}$) according to the weight value. In the long-term memory circuit 14, a voltage drop amount per hour is small since a time constant is relatively large. Therefore, the long-term memory circuit 14 can continuously generate the second control voltage ($V_{W2}$) according to the weight value in a long time with high precision.

Moreover, the multiplication device 10 connects the short-term memory circuit 12 to the long-term memory circuit 14 to transfer an electric charge from the long-term memory circuit 14 to the short-term memory circuit 12, thereby matching the first control voltage ($V_{W1}$) generated by the short-term memory circuit 12 with the second control voltage ($V_{W2}$) generated by the long-term memory circuit 14. Therefore, the multiplication device 10 can output the first control voltage ($V_{W1}$) according to the weight value to the short-term memory circuit 12 in a long time with high precision.

Even in a case where the long-term memory circuit 14 with a large time constant is connected to the short-term memory circuit 12 with a small time constant, a reduction amount of voltages is small. Therefore, the multiplication device 10 can keep causing the short-term memory circuit 12 to generate the first control voltage ($V_{W1}$) according to the weight value with high precision by only connecting the short-term memory circuit 12 to the long-term memory circuit 14. Therefore, the multiplication device 10 can cause the short-term memory circuit 12 with a small time constant to output the first control voltage ($V_{W1}$) according to the weight value in a long time through the simple calibration and processing.

Modified Examples of First Embodiment

Hereinafter, modified examples of the first embodiment will be described. In the description of the modified example, components having the same functions and configurations as those illustrated in FIG. 1 are designated by the same reference numerals and detailed descriptions are not repeated except for the differences.

Figure 3:
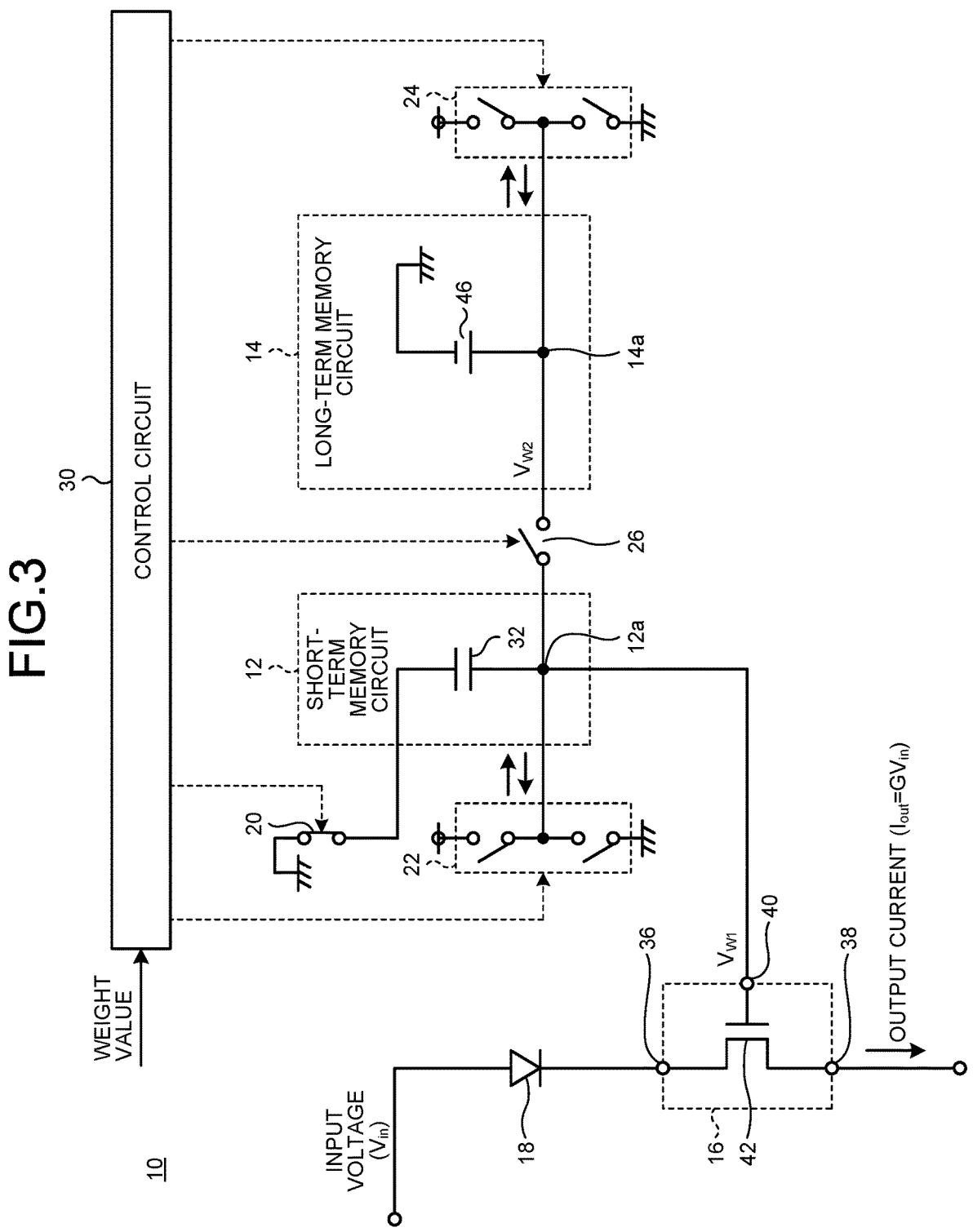
FIG. 3 is a diagram illustrating a configuration of a multiplication device according to a first modified example.

FIG. 3 is a diagram illustrating a configuration of the multiplication device 10 according to a first modified example of the first embodiment.

The long-term memory circuit 14 according to the first modified example includes an electric storage element 46 in place of the capacitor. The electric storage element 46 has a larger time constant than that of the short-term memory circuit 12. The electric storage element 46 is, for example, a thin-film all-solid-state battery. For example, the electric storage element 46 includes a positive electrode made of lithium cobalt oxide, a solid electrolyte made of lithium phosphate, and a negative electrode made of copper.

It is preferable for the electric storage element 46 that, a relationship between the amount of transferred electric charges and an electromotive force V in charging and discharging is made close to linear through attempts for the selection of thin-film materials and manufacturing methods. The control circuit 30 is required to at least generate the second control voltage ($V_{W2}$) that is equal to the first control voltage ($V_{W1}$) generated by the short-term memory circuit 12 in the setting process. Therefore, the electric storage element 46 may have a nonlinear property as long as the electric storage element 46 has a linear property enough to generate a desired voltage.

The control circuit 30 according to the first modified example controls charging and discharging by the electric storage element 46 by a circuit similar to a charging and discharging control circuit of a lithium-ion battery, for example. However, in the all-solid-state battery, a voltage-capacity curve of charging is generally different from a voltage-capacity curve of discharging. Therefore, the control circuit 30 may be provided with a charge-only or discharge-only mode and may perform the control so as to generate the second control voltage ($V_{W2}$) equal to the first control voltage ($V_{W1}$) generated by the short-term memory circuit 12 in either charge or discharge, in the setting process. For example, in the setting process, the control circuit 30 performs the control of generating the desired second control voltage ($V_{W2}$) through a charging process after the electric storage element 46 is once discharged. Alternatively, for example, in the setting process, the control circuit 30 performs the control of generating the desired second control voltage ($V_{W2}$) through a discharging process after the electric storage element 46 is once charged.

The electric storage element 46 has a very high capacity as a battery. With this configuration, the multiplication device 10 according to the first modified example is provided with the long-term memory circuit 14 with a small area and a large time constant, so that it is possible to reduce the size.

Figure 4:
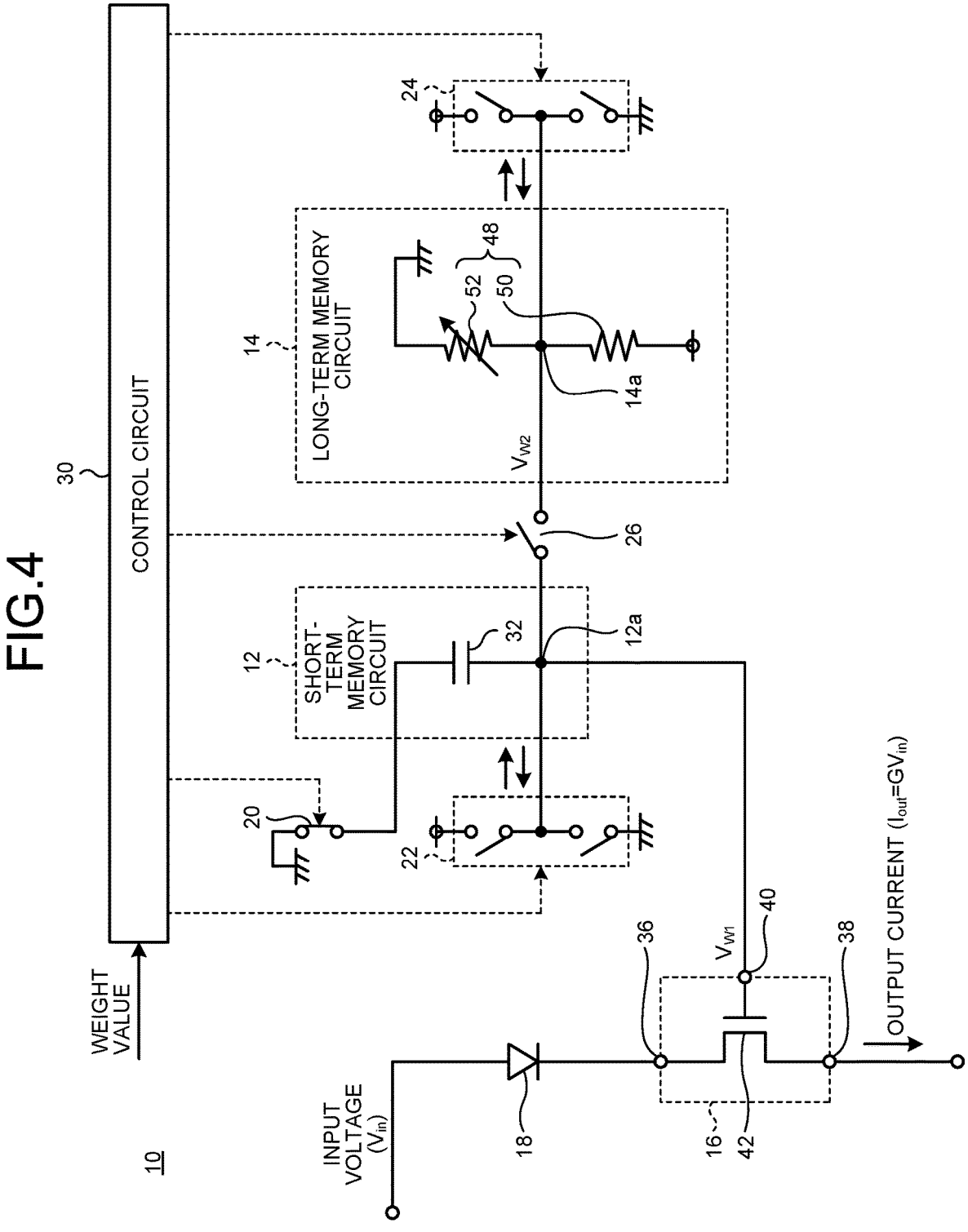
FIG. 4 is a diagram illustrating a configuration of a multiplication device according to a second modified example.

FIG. 4 is a diagram illustrating a configuration of the multiplication device 10 according to a second modified example of the first embodiment.

The long-term memory circuit 14 according to the second modified example includes a variable resistance circuit 48 in place of the capacitor. The variable resistance circuit 48 has a larger time constant than that of the short-term memory circuit 12. The variable resistance circuit 48 includes, for example, a fixed resistor 50 and a variable resistor 52, which are connected in series. The fixed resistor 50 and the variable resistor 52, which are connected in series, are connected between the power supply potential and the ground potential. The variable resistance circuit 48 generates the second control voltage ($V_{W2}$) from a connection point, between the fixed resistor 50 and the variable resistor 52, as the second terminal 14a.

The variable resistor 52 may be a memristor (memory resistor), for example. The memristor can be set to a resistance value in any analog quantity in accordance with the amount of electric charges that pass through the memristor. The memristor is composed of a thin film of a metal and metal oxide. The memristor is formed of tungsten, tungsten oxide, titanium nitride, or the like, for example. By using the memristor as the variable resistor 52, the control circuit 30 can control the second control voltage ($V_{W2}$) generated by the long-term memory circuit 14 in accordance with a current flowing through the variable resistor 52 in the setting process.

The variable resistance circuit 48 can continue to generate the second control voltage ($V_{W2}$) over a long period of time. Even in a case where the variable resistance circuit 48 is connected to the short-term memory circuit 12 in the calibration process, there is no voltage drop due to charge transfer. Therefore, the multiplication device 10 according to the second modified example, which is provided with the variable resistance circuit 48, can cause the short-term memory circuit 12 to generate the first control voltage ($V_{W1}$) according to the weight value with high precision over a long period of time, thereby capable of executing the multiplication process with high precision for a long time.

Figure 5:
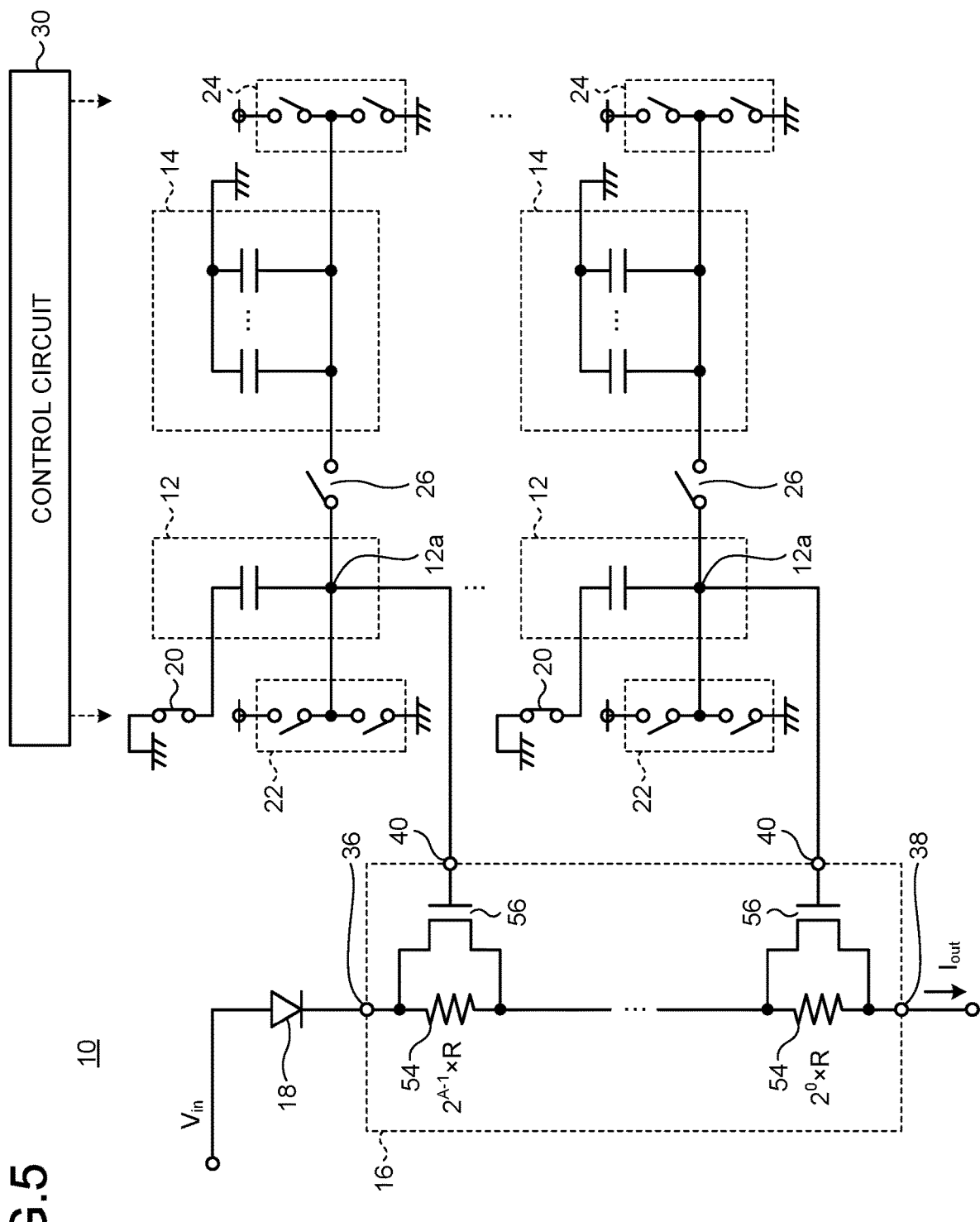
FIG. 5 is a diagram illustrating a configuration of a multiplication device according to a third modified example.

FIG. 5 is a diagram illustrating a configuration of the multiplication device 10 according to a third modified example of the first embodiment. The conversion circuit 16 according to the third modified example includes a plurality of resistors 54 and a plurality of selection switches 56.

The resistors 54 are connected in series between the input terminal 36 and the output terminal 38. Respective resistances of the resistors 54 are different from one another. For example, while the first resistor 54 of the resistors 54 is set to have a resistance value of $2^0 \times R$ (R is any positive real number), the second resistor 54 is set to have a resistance value of $2^1 \times R$. A resistance value of the A-th (A is an integer of equal to or greater than 2) resistor 54 is set to $2^{(A-1)} \times R$.

The selection switches 56 and the resistors 54 are installed in one-to-one correspondence. Each of the selection switches 56 is, for example, a FET that operates as a switch.

Each of the selection switches 56 connects or disconnects two ends of a resistor 54 to which a selection switch 56 correspond, among the resistors 54. Thus, in a case where each of the selection switches 56 is in a connected state, it is possible to allow a current flowing from the input terminal 36 to the output terminal 38 to bypass a corresponding resistor 54. In addition, in a case where each of the selection switches 56 is in a disconnected state, it is possible to allow a current flowing from the input terminal 36 to the output terminal 38 to flow via a corresponding resistor 54.

The conversion circuit 16 can change the conductance (G) between the input terminal 36 and the output terminal 38 depending on the selection switches 56 being in the connected state or the disconnected state.

The multiplication device 10 according to the third modified example includes a plurality of the short-term memory circuits 12, a plurality of the long-term memory circuits 14, a plurality of the reference potential switches 20, a plurality of the adjustment switches 22, a plurality of the setting switches 24, a plurality of the calibration switches 26, and the control circuit 30.

The short-term memory circuits 12 correspond to the selection switches 56 on a one-to-one basis. Each of the short-term memory circuits 12 generates a binary first control voltage ($V_{W1}$) to switch whether a corresponding selection switch 56 is in the connected state or the disconnected state.

The long-term memory circuits 14 correspond to the short-term memory circuits 12 on a one-to-one basis. Each of the long-term memory circuits 14 generates the second control voltage ($V_{W2}$) equal to the first control voltage ($V_{W1}$) generated by a corresponding short-term memory circuit 12.

The reference potential switches 20 correspond to the short-term memory circuits 12 on a one-to-one basis. Each of the reference potential switches 20 short-circuits or disconnects a terminal opposite to a first terminal 12a of a corresponding short-term memory circuit 12 from the ground potential.

The adjustment switches 22 correspond to the short-term memory circuits 12 on a one-to-one basis. Each of the adjustment switches 22 connects a first terminal 12a of a corresponding short-term memory circuit 12 to the ground potential or power supply potential to charge the corresponding short-term memory circuit 12 with an electric charge or make the corresponding short-term memory circuit 12 discharge the electric charge during the adjustment.

The setting switches 24 correspond to the long-term memory circuits 14 on a one-to-one basis. Each of the setting switches 24 connects a second terminal 14a of a corresponding long-term memory circuit 14 to the ground potential or power supply potential to charge the long-term memory circuit 14 with an electric charge or make the long-term memory circuit 14 discharge the electric charge during the setting.

The calibration switches 26 correspond to the short-term memory circuits 12 on a one-to-one basis. Each of the calibration switches 26 connects a corresponding short-term memory circuit 12 to a corresponding long-term memory circuit 14 during the calibration to allow an electric charge to be transferred from the corresponding long-term memory circuit 14 to the corresponding short-term memory circuit 12.

In the third modified example, the control circuit 30 selects one or two or more of the short-term memory circuits 12 in accordance with weight values received, and causes the selected one or two or more of the short-term memory circuits 12 to generate the first control voltage ($V_{W1}$) through which the selection switch 56 is in the disconnected state. In addition, the control circuit 30 causes an unselected short-term memory circuit 12 to generate the first control voltage ($V_{W1}$) through which the selection switch 56 is in the connected state. The control circuit 30 may select one or two or more of the short-term memory circuits 12 based on, for example, a table or function representing a corresponding relationship between the weight values and the selected one or two or more of the short-term memory circuits 12.

In the control circuit 30, the first control voltage ($V_{W1}$) generated by each of the short-term memory circuits 12 is supplied to a corresponding selection switch 56 during the operation. With this configuration, the conversion circuit 16 can cause a current to flow by passing through one or two or more of the resistors 54 corresponding to one or two or more of the selected short-term memory circuits 12, among the resistors 54 that are connected in series. Therefore, the conversion circuit 16 can make the conductance (G) variable according to the weight value, and the conductance (G) can be made between the input terminal 36 and the output terminal 38 according to the weight value. With this configuration, during the operation, the conversion circuit 16 outputs the output current ($I_{out} = G \times V_{in}$) obtained by multiplying the input voltage ($V_{in}$) by the conductance (G).

The multiplication device 10 according to the third modified example can change the conductance (G) by switching the resistors 54, so that the conductance (G) can be represented with high precision, and multiplication with high precision can be carried out. In addition, since the multiplication device 10 according to the third modified example only needs to generate a binary voltage for each of the short-term memory circuits 12, control to generate the desired voltage during adjustment is simplified. In addition, since the multiplication device 10 according to the third modified example only needs to generate a binary voltage for each of the long-term memory circuits 14, control to generate the desired voltage during setting is simplified.

Figure 6:
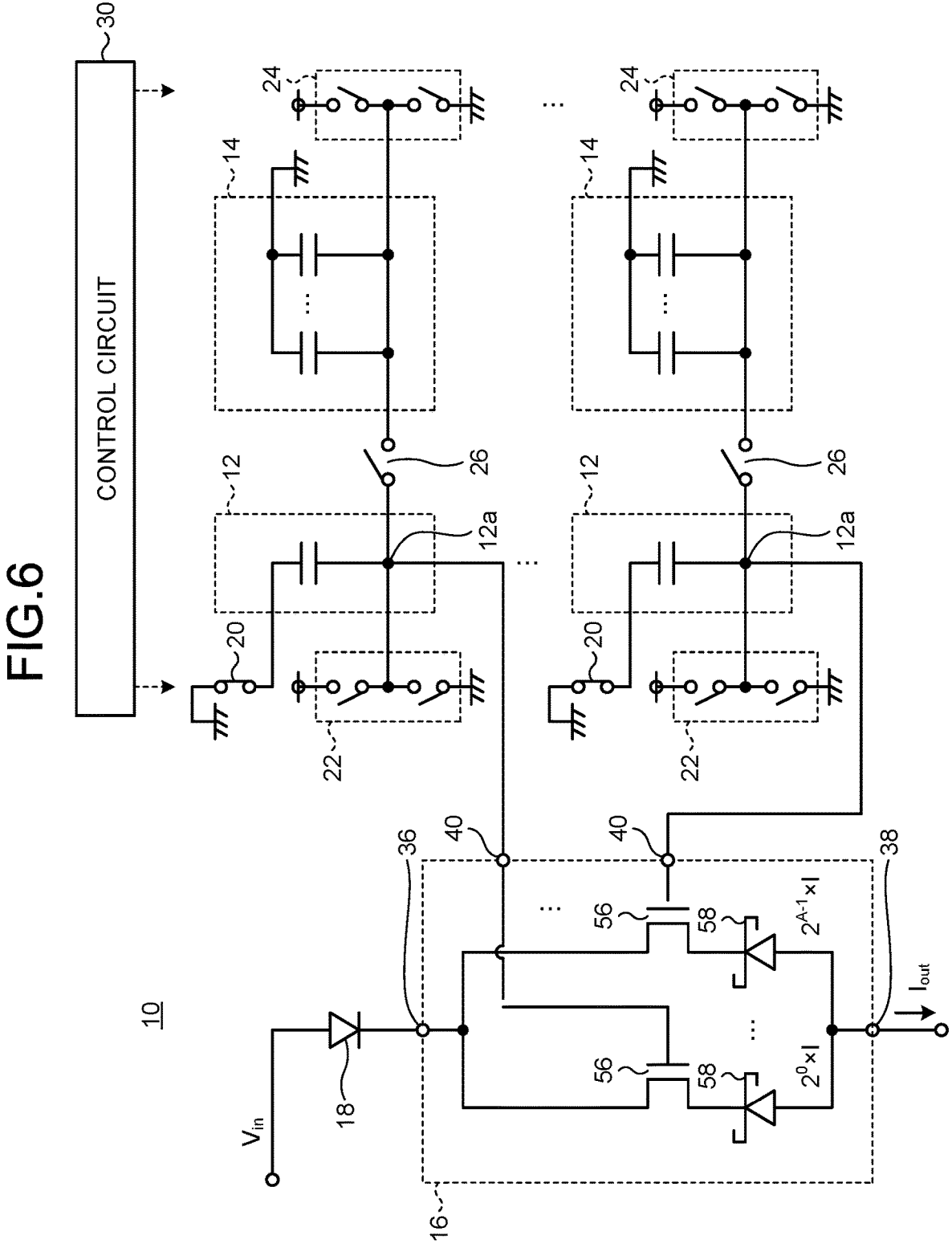
FIG. 6 is a diagram illustrating a configuration of a multiplication device according to a fourth modified example.

FIG. 6 is a diagram illustrating a configuration of the multiplication device 10 according to a fourth modified example of the first embodiment. The multiplication device 10 according to the fourth modified example has the same configuration as that of the third modified example, except for the conversion circuit 16.

The conversion circuit 16 according to the fourth modified example includes a plurality of Schottky barrier diodes 58 and the selection switches 56.

Each of the Schottky barrier diodes 58 has a reverse voltage-current property of allowing a constant current (reverse current) to flow regardless of a voltage. In each of the Schottky barrier diodes 58, for example, the reverse current is different from those of other Schottky barrier diodes 58. For example, a first Schottky barrier diode 58 in the Schottky barrier diodes 58 allows the reverse current of $2^0 \times I$ (I is any positive real number) to flow. A second Schottky barrier diode 58 allows the reverse current of $2^1 \times I$ to flow. An A-th Schottky barrier diode 58 allows the reverse current of $2^{(A-1)} \times I$ to flow.

The selection switches 56 and the Schottky barrier diodes 58 are installed in one-to-one correspondence. Each of the selection switches 56 is, for example, a FET that operates as a switch.

Each of the Schottky barrier diodes 58 is connected to a corresponding selection switch 56 in series. The Schottky barrier diode 58 and the selection switch 56, which are connected in series, are connected between the input terminal 36 and the output terminal 38.

Each of the selection switches 56 carries out connection or disconnection. Therefore, in a case where each of the selection switches 56 is in a connected state, each of the selection switches 56 is possible to allow a current to flow from the input terminal 36 to the output terminal 38 via a corresponding Schottky barrier diode 58. In addition, in a case where each of the selection switches 56 is in a disconnected state, each of the selection switches 56 is possible not to allow a current to flow from the input terminal 36 to the output terminal 38 via a corresponding Schottky barrier diode 58.

The conversion circuit 16 can change the conductance (G) between the input terminal 36 and the output terminal 38 depending on the selection switches 56 being in the connected state or the disconnected state.

Since the multiplication device 10 according to the fourth modified example can change the conductance (G) by switching the Schottky barrier diodes 58, the conductance (G) can be represented with high precision, and multiplication with high precision can be carried out. In addition, since the multiplication device 10 according to the fourth modified example eliminates dependence on the input voltage ($V_{in}$), a multiply-accumulate operation in which the input voltage ($V_{in}$) is expressed as an analog quantity cannot be carried out. However, the multiplication device 10 according to the fourth modified example can output a stable output current ($I_{out}$) since the multiplication device 10 outputs a constant current regardless of voltage error in a case where the input voltage ($V_{in}$) is zero.

The Schottky barrier diodes 58 can lower the reverse current to the order of nA and operate stably. Therefore, the multiplication device 10 according to the fourth modified example can achieve low power consumption. However, the multiplication device 10 according to the fourth modified example is required to include the rectifier circuit 18 to carry out rectification so that the forward current does not flow to the Schottky barrier diodes 58. In the fourth modified example, the rectifier circuit 18 has a conductance that is sufficiently larger than a reverse voltage-current property of the Schottky barrier diodes 58, and the amount of currents is suppressed to be sufficiently low in a case where a reverse voltage is applied.

Second Embodiment

Figure 7:
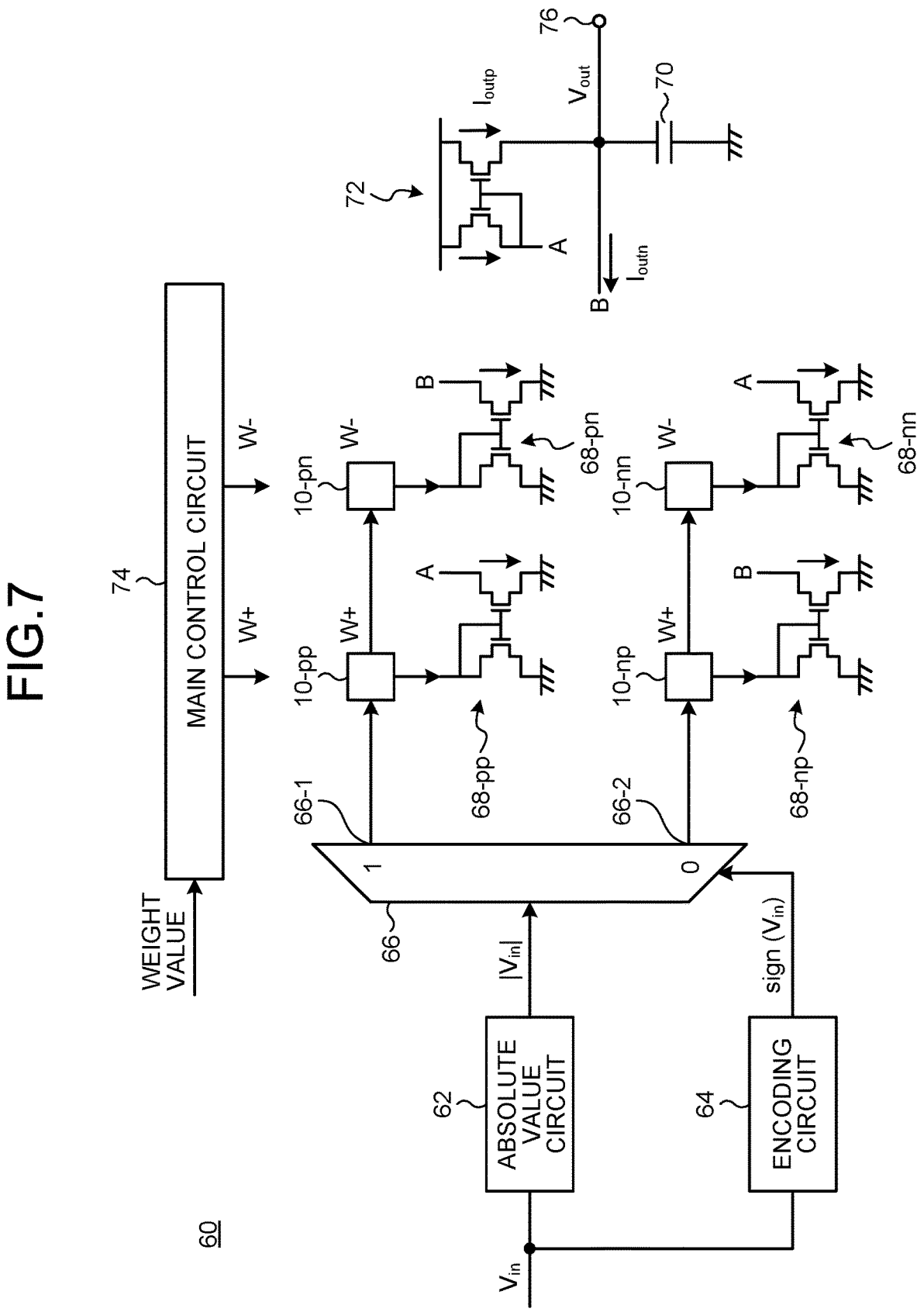
FIG. 7 is a diagram illustrating a configuration of a signed multiplication device according to a second embodiment.

FIG. 7 is a diagram illustrating a configuration of a signed multiplication device 60 according to a second embodiment.

The signed multiplication device 60 according to the second embodiment outputs an output value obtained by multiplying an input value with positive and negative signs by a weight value with positive and negative signs.

The signed multiplication device 60 receives an input voltage ($V_{in}$) with positive or negative signs according to the input value. In the signed multiplication device 60, a conductance (G) with positive and negative signs is set in accordance with the weight value. The signed multiplication device 60 outputs an output voltage ($V_{out} = G \times V_{in}$) obtained by multiplying the input voltage ($V_{in}$) by the conductance (G), as the output value. The output voltage ($V_{out}$) is expressed as positive or negative with a predetermined common voltage (for example, $\frac{1}{2} \times V_{DD}$) as 0 and a common voltage as 0.

The signed multiplication device 60 includes an absolute value circuit 62, an encoding circuit 64, a selector 66, a first multiplication circuit 10-*pp*, a second multiplication circuit 10-*pn*, a third multiplication circuit 10-*np*, a fourth multiplication circuit 10-*nn*, a first current mirror circuit 68-*pp*, a second current mirror circuit 68-*pn*, a third current mirror circuit 68-*np*, a fourth current mirror circuit 68-*nn*, an output capacitor 70, an output current mirror circuit 72, and a main control circuit 74.

The absolute value circuit 62 receives an input voltage ($V_{in}$) and outputs an absolute input voltage ($|V_{in}|$) obtained by performing absolute processing on the input voltage ($V_{in}$). The encoding circuit 64 receives an input voltage ($V_{in}$) and outputs a code signal (sign($V_{in}$)) obtained by encoding the input voltage ($V_{in}$). For example, the encoding circuit 64 outputs a code signal (sign($V_{in}$)) that represents 1 in a case where the input voltage ($V_{in}$) is equal to or greater than 0, and that represents 0 in a case where the input voltage ($V_{in}$) is negative.

The selector 66 receives the absolute input voltage ($|V_{in}|$) and the code signal (sign($V_{in}$)). The selector 66 causes a first output terminal 66-1 to output an absolute input voltage ($|V_{in}|$) in a case where the code signal (sign($V_{in}$)) is 1, that is, in a case where the input voltage ($V_{in}$) is equal to or greater than 0. The selector 66 causes a second output terminal 66-2 to output an absolute input voltage ($|V_{in}|$) in a case where the code signal (sign($V_{in}$)) is 0, that is, in a case where the input voltage ($V_{in}$) is negative.

The first multiplication circuit 10-*pp*, the second multiplication circuit 10-*pn*, the third multiplication circuit 10-*np*, and the fourth multiplication circuit 10-*nn* have the same configurations as in the first embodiment and the individual modified examples of the first embodiment.

The absolute input voltage ($|V_{in}|$) output from the first output terminal 66-1 of the selector 66 is input to the first multiplication circuit 10-*pp* and the second multiplication circuit 10-*pn* as the input voltage ($V_{in}$), and each of the first multiplication circuit 10-*pp* and the second multiplication circuit 10-*pn* outputs an output current ($I_{out}$). The absolute input voltage ($|V_{in}|$) output from the second output terminal 66-2 of the selector 66 is input to the third multiplication circuit 10-*np* and the fourth multiplication circuit 10-*nn* as the input voltage ($V_{in}$), and each of the third multiplication circuit 10-*np* and the fourth multiplication circuit 10-*nn* outputs an output current ($I_{out}$).

The first current mirror circuit 68-*pp* receives the output current ($I_{out}$) from the first multiplication circuit 10-*pp* and outputs a first reference current equal to the received output current ($I_{out}$). The second current mirror circuit 68-*pn* receives the output current ($I_{out}$) from the second multiplication circuit 10-*pn* and outputs a second reference current equal to the received output current ($I_{out}$).

The third current mirror circuit 68-*np* receives the output current ($I_{out}$) from the third multiplication circuit 10-*np* and outputs a third reference current equal to the received output current ($I_{out}$). The fourth current mirror circuit 68-*nn* receives the output current ($I_{out}$) from the fourth multiplication circuit 10-*nn* and outputs a fourth reference current equal to the received output current ($I_{out}$).

The output current mirror circuit 72 receives a current obtained by adding the first reference current output from the first current mirror circuit 68-*pp* to the fourth reference current output from the fourth current mirror circuit 68-*nn*. The output current mirror circuit 72 then outputs a positive composite current ($I_{outp}$) that is the same as the current obtained by adding the first reference current to the fourth reference current.

The output capacitor 70 is provided between a voltage output terminal 76 and the ground potential.

The output capacitor 70 receives the positive composite current ($I_{outp}$) from the terminal connected to the voltage output terminal 76 and stores an electric charge corresponding to the received positive composite current ($I_{outp}$). Moreover, the second current mirror circuit 68-*pn* and the third current mirror circuit 68-*np* draw and output a negative composite current ($I_{outn}$) obtained by adding the second reference current to the third reference current from a terminal connected to the voltage output terminal 76 in the output capacitor 70.

The output capacitor 70 is charged with an electric charge in accordance with the output current ($I_{out}$) output from the first multiplication circuit 10-*pp* and the fourth multiplication circuit 10-*nn*, and the electric charge thereof is discharged in accordance with the output current ($I_{out}$) output from the second multiplication circuit 10-*pn* and the third multiplication circuit 10-*np*.

The main control circuit 74 receives a weight value from an external device.

In a case where the weight value is equal to or greater than 0, the main control circuit 74 gives the absolute value of the weight value to the first multiplication circuit 10-*pp* and the third multiplication circuit 10-*np*, and causes the first multiplication circuit 10-*pp* and the third multiplication circuit 10-*np* to set the conductance (G) to a value according to the absolute value of the weight value. In a case where the weight value is equal to or greater than 0, the main control circuit 74 gives 0 as the weight value to the second multiplication circuit 10-*pn* and the fourth multiplication circuit 10-*nn* to set the conductance (G) to 0.

In a case where the weight value is negative, the main control circuit 74 gives the absolute value of the weight value to the second multiplication circuit 10-*pn* and the fourth multiplication circuit 10-*nn*, and causes the second multiplication circuit 10-*pn* and the fourth multiplication circuit 10-*nn* to set the conductance (G) to a value according to the absolute value of the weight value. In a case where the weight value is negative, the main control circuit 74 gives 0 as the weight value to the first multiplication circuit 10-*pp* and the third multiplication circuit 10-*np* to set the conductance (G) to 0.

The signed multiplication device 60 with such a configuration operates as follows.

First, the storage amount of electric charges in the output capacitor 70 is adjusted to generate a predetermined common voltage (for example, $\frac{1}{2} \times V_{DD}$). The signed multiplication device 60 then receives the input voltage ($V_{in}$) according to the input value and executes the multiplication process.

In a case where the input value is equal to or greater than 0 and the weight value is equal to or greater than 0, the first multiplication circuit 10-*pp* outputs an output current ($I_{out}$) obtained by multiplying the absolute value of the input value by the absolute value of the weight value. In this case, the output capacitor 70 is charged with an electric charge according to the output current ($I_{out}$) output from the first multiplication circuit 10-*pp*, and increases the output voltage ($V_{out}$) by a voltage corresponding to the multiplication value.

In a case where the input value is equal to or greater than 0 and the weight value is negative, the second multiplication circuit 10-*pn* outputs an output current ($I_{out}$) obtained by multiplying the absolute value of the input value by the absolute value of the weight value. In this case, the output capacitor 70 charged with the electric charge according to the output current ($I_{out}$) output from the second multiplication circuit 10-*pn* is discharged, and decreases the output voltage ($V_{out}$) by a voltage according to the multiplication value.

In a case where the input value is negative and the weight value is equal to or greater than 0, the third multiplication circuit 10-*np* outputs an output current ($I_{out}$) obtained by multiplying the absolute value of the input value by the absolute value of the weight value. In this case, the output capacitor 70 charged with the electric charge according to the output current ($I_{out}$) output from the third multiplication circuit 10-*np* is discharged, and decreases the output voltage ($V_{out}$) by a voltage according to the multiplication value.

In a case where the input value is negative and the weight value is negative, the fourth multiplication circuit 10-*nn* outputs an output current ($I_{out}$) obtained by multiplying the absolute value of the input value by the absolute value of the weight value. In this case, the output capacitor 70 is charged with an electric charge according to the output current ($I_{out}$) output from the fourth multiplication circuit 10-*nn*, and increases the output voltage ($V_{out}$) by a voltage according to the multiplication value.

The signed multiplication device 60 outputs, from the voltage output terminal 76, a voltage corresponding to the electric charge stored in the output capacitor 70 as the output voltage ($V_{out}$). With this configuration, the signed multiplication device 60 can output the output value obtained by multiplying the input value with positive and negative signs by the weight value with positive and negative signs as the output voltage ($V_{out}$).

Third Embodiment

Figure 8:
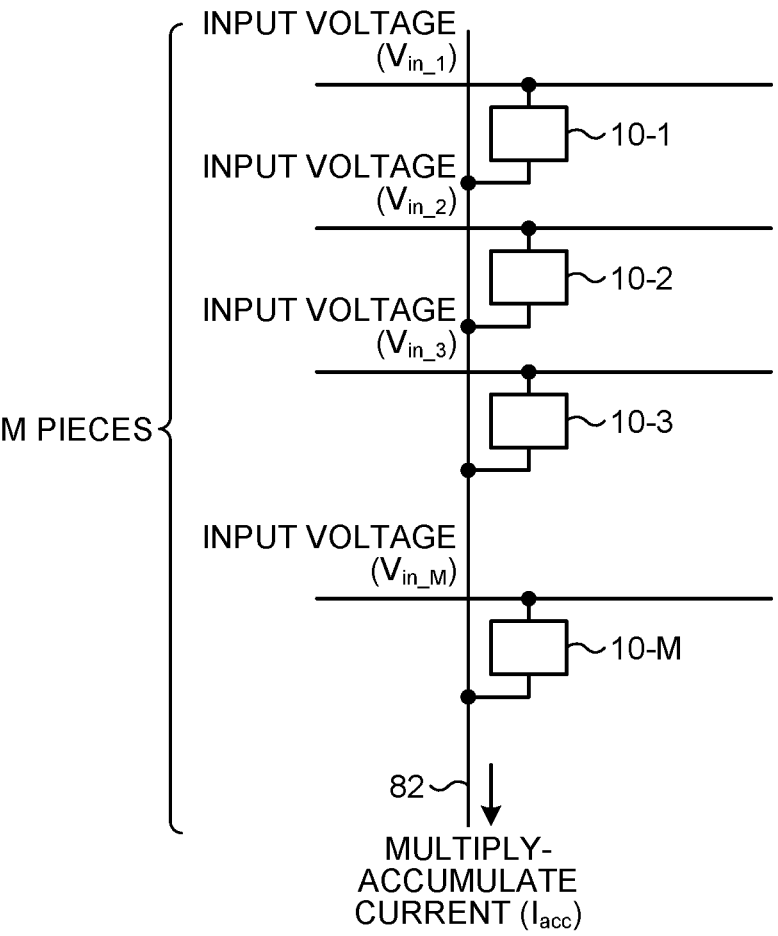
FIG. 8 is a diagram illustrating a configuration of a multiply-accumulate operation device according to a third embodiment.

FIG. 8 is a diagram illustrating a configuration of a multiply-accumulate operation device 80 according to a third embodiment. The multiply-accumulate operation device 80 according to the third embodiment outputs a multiply-accumulate operation value obtained by performing multiply-accumulate operation on M input values (M is an integer of equal to or greater than 2) and M weight values.

The multiply-accumulate operation device 80 receives M input voltages ($V_{in\_1}$ to $V_{in\_M}$) according to the M input values. The multiply-accumulate operation device 80 then outputs a multiply-accumulate current ($I_{acc}$) obtained by performing multiply-accumulate operation on the M input values and the M weight values as the multiply-accumulate operation value.

The multiply-accumulate operation device 80 is provided with M multiplication devices 10 (10-1 to 10-M) and an output line 82. Each of the M multiplication devices 10 has the same configuration as those in the first embodiment and each of the modified examples of the first embodiment.

The M multiplication devices 10 correspond to the M weight values on a one-to-one basis. The m-th multiplication device 10-*m* (m is an integer of 1 through M, both inclusive) of the M multiplication devices 10 outputs an output value obtained by multiplying the m-th input value of the M input values by the m-th weight value of the M weight values. That is, the m-th multiplication device 10-*m* receives an input voltage ($V_{in\_m}$) according to the m-th input value. In addition, the m-th conductance ($G_{-m}$) according to the m-th weight value is set in the m-th multiplication device 10-*m*. The m-th multiplication device 10-*m* outputs an output current ($I_{out}$=$G_{-m}$×$V_{in\_m}$) obtained by multiplying the m-th input voltage ($V_{in}$) by the m-th conductance (G), as the output value.

Each of the M multiplication devices 10 outputs the output current ($I_{out}$) toward the output line 82. The output current ($I_{out}$) output from each of the M multiplication devices 10 is subjected to addition operation in the output line 82. Therefore, the output line 82 outputs the multiply-accumulate current ($I_{acc}$) obtained by adding up the output currents ($I_{out}$) output from the M multiplication devices 10, as the multiply-accumulate operation value obtained by performing the multiply-accumulate operation on the M input values and the M weight values.

The multiply-accumulate operation device 80 as described above can execute a multiply-accumulate operation process with a high resolution and high precision, with a very simple configuration since the multiply-accumulate operation is performed by using the M multiplication devices 10.

Fourth Embodiment

Figure 9:
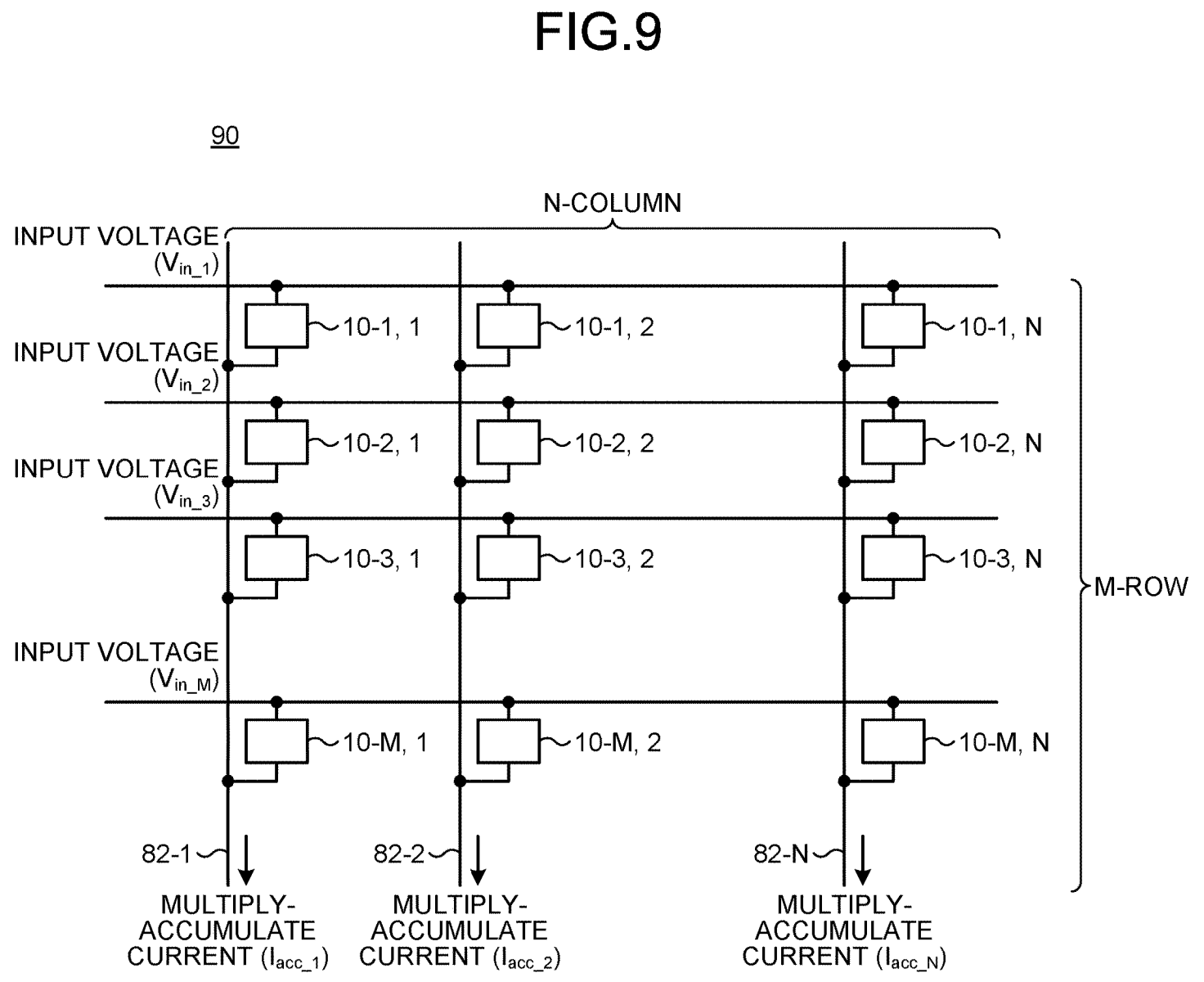

FIG. 9 is a diagram illustrating a configuration of a matrix operation device 90 according to a fourth embodiment. The matrix operation device 90 according to the fourth embodiment outputs N-column multiply-accumulate operation values (N is an integer of equal to or greater than 1) obtained by performing matrix operation on M-column input values and M-row×N-column weight values. The matrix operation device 90 receives M input voltages ($V_{in\_1}$ to $V_{in\_M}$) corresponding to the M-column input values. The matrix operation device 90 then outputs N multiply-accumulate currents ($I_{acc\_1}$ to $I_{acc\_N}$) obtained by performing the matrix operation on the M-column input values and the M-row×N-column weight values, as the N-column multiply-accumulate operation values.

The matrix operation device 90 is provided with M×N multiplication devices 10 (10-1, 1 to 10-M, N) and N output lines 82 (82-1 to 82-N). Each of the M multiplication devices 10 has the same configuration as those of the first embodiment and each of the modified examples of the first embodiment.

The M×N multiplication devices 10 correspond to the M-row×N-column weight values on a one-to-one basis. A multiplication device 10-*m,n* of the M×N multiplication devices 10, which correspond to the n-th column and the m-th row (n is an integer of 1 through N, both inclusive), outputs an output value obtained by multiplying an m-th column input value of the M column input values by a weight value in the n-th column and the m-th row of the M-row×N-column weight values.

Specifically, the multiplication device 10-*m,n* corresponding to the n-th column and the m-th row receives an input voltage ($V_{in\_m}$) according to the m-th column input value. A conductance ($G_{-m,n}$) according to the weight value in the n-th column and the m-th row is set in the multiplication device 10-*m,n* corresponding to the n-th column and the m-th row. The multiplication device 10-*m,n* corresponding to the n-th column in the m-th row outputs an output current ($I_{out}$=$G_{-m,n}$×$V_{in\_m}$) obtained by multiplying the input voltage ($V_{in\_m}$) according to the m-th column input value by a conductance ($G_{-m,n}$) in the n-th column and the m-th row, as the output value.

Each of the M multiplication devices 10-1, m to 10-M, and m of the M×N multiplication devices 10, which correspond to the n-th column, outputs an output current ($I_{out}$) to the n-th output line 82 of the N output lines 82. The output current ($I_{out}$) output from each of the M multiplication devices 10-1, m to 10-M, and m corresponding to the n-th column is subjected to addition operation in the n-th output line 82. Therefore, the n-th output line 82 outputs a current obtained by adding up the output currents ($I_{ut}$) output from the M multiplication devices 10-1, m to 10-M, and m corresponding to the n-th column, as the n-th multiply-accumulate current ($I_{acc\_n}$) of the M multiply-accumulate currents ($I_{acc\_1}$ to $I_{acc\_N}$). Thereby, the N output lines 82 can output the N multiply-accumulate currents ($I_{acc\_1}$ to $I_{acc\_N}$) obtained by performing the matrix operation on the M-column input values and the M-row×N-column weight values, as the N-column multiply-accumulate operation values.

The matrix operation device 90 as described above can execute the multiply-accumulate operation process with a high resolution and high precision, with a very simple configuration since the matrix operation is performed by using the M×N multiplication devices 10 (10-1, 1 to 10-M, N).

Fifth Embodiment

Figure 10:
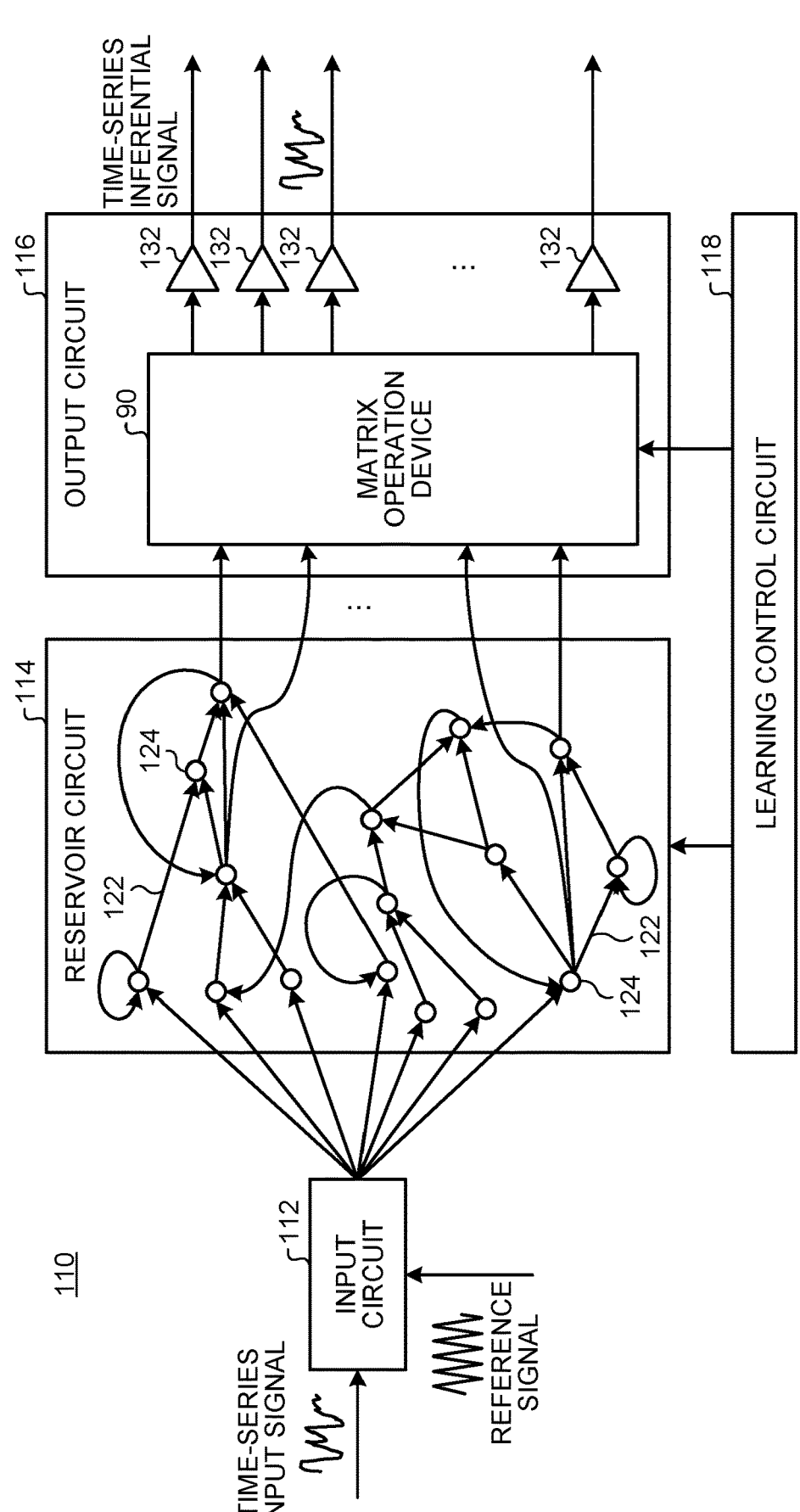
FIG. 10 is a diagram illustrating a configuration of a reservoir device according to a fifth embodiment.

FIG. 10 is a diagram illustrating a configuration of a reservoir device 110 according to a fifth embodiment. The reservoir device 110 is one of the recurrent neural networks. The reservoir device 110 according to the present embodiment is implemented by using an analog circuit.

The reservoir device 110 receives a time-series input signal. The time-series input signal is a signal whose value changes in a time direction. In the present embodiment, the time-series input signal is a voltage signal whose value is represented by an analog voltage. The time-series input signal may be a time-series digital signal.

The reservoir device 110 then outputs one or more time-series inferential signals. Each of one or more time-series inferential signals is a signal whose value varies in the time direction. In the present embodiment, each of one or more time-series inferential signals is a voltage signal whose value is represented by an analog voltage. Each of one or more time-series inferential signals may be a time-series digital signal.

Each of one or more time-series inferential signals may be a signal representing a feature of the time-series input signal, for example. For example, each of the one or more time-series inferential signals may be the same signal as the time-series input signal, or may be a signal inferred from the time-series input signal after a predetermined time has elapsed. In addition, each of the one or more time-series inferential signals may be a signal representing abnormality in the time-series input signal at the present time or after a predetermined time has elapsed, or may be a signal representing a feature component in which noise or the like is removed from the time-series input signal.

The reservoir device 110 has an input circuit 112, a reservoir circuit 114, an output circuit 116, and a learning control circuit 118.

The input circuit 112 receives a time-series input signal and outputs a time-series preprocessing signal that is processed in a predetermined manner on the time-series input signal. For example, the input circuit 112 acquires a reference signal representing a reference waveform and outputs a time-series preprocessing signal representing a difference between the time-series signal and the reference signal. The input circuit 112 may output the time-series input signal as it is as the time-series preprocessing signal.

The reservoir circuit 114 includes a plurality of synapse circuits 122 and a plurality of neuron circuits 124. In the present embodiment, each of the synapse circuits 122 and each of the neuron circuits 124 are implemented by an analog circuit.

A synapse weight is set in each of the synapse circuits 122. Each of the synapse circuits 122 receives a firing signal from any one neuron circuit 124 of the neuron circuits 124. Each of the synapse circuits 122 provides a signal obtained by adding an influence of the set synapse weight to the received firing signal to any one of the neuron circuits 124. For example, the synapse weight may be represented by a binary value of 1 and −1, or a trivalent value of 1, −1, and 0. The synapse weight may be represented by a tri- or more of multi-valent value or a continuous value. Each of the synapse circuits 122 may delay the firing signal in accordance with the set synapse weight. Each of the synapse circuits 122 may change a level of the firing signal in accordance with the set synapse weight. Each of the synapse circuits 122 may be configured not to output a signal even though the firing signal is received in a case where the set synapse weight is set to 0 out of the trivalent values of 1, −1, and 0.

Each of the neuron circuits 124 receives signals from one or more of the synapse circuits 122. Some of the neuron circuits 124 receive time-series preprocessing signals from the input circuit 112. The neuron circuits 124 that receive time-series preprocessing signals may further receive signals from one or more synapse circuits 122, in addition to the time-series preprocessing signals.

Each of the neuron circuits 124 accumulates one or more signals that have been received, performs activation function processing on accumulated values, and outputs a firing signal. Each of the neuron circuits 124 may perform thresholding processing on the accumulated values or may output a probabilistic firing signal on the accumulated values. The firing signal is, for example, a pulse waveform that becomes logic H at the timing of firing and then becomes logic L a certain time after becoming the logic H.

A firing signal output from at least one neuron circuit 124 of the neuron circuits 124 is fed back to the one neuron circuit 124 through one or more synapse circuits 122. For example, the firing signal output from a neuron circuit 124 may be directly fed back to this neuron circuit 124 through the synapse circuits 122. In addition, the firing signal output from a neuron circuit 124 may be fed back to this neuron circuit 124 via the synapse circuits 122 and one or more of the other neuron circuits 124. With this configuration, the reservoir circuit 114 can constitute a recurrent neural network.

The reservoir circuit 114 may be able to switch a connection relationship between the synapse circuits 122 and the neuron circuits 124 optionally. For example, the reservoir circuit 114 may have a modular circuit in which an output terminal of each of the neuron circuits 124 is connected to input terminals of all the neuron circuits 124 via different synapse circuits 122. In this case, the module circuit can cause the learning control circuit 118 to switch whether to enable or disable each of the multiple synapse circuits 122. An enabled synapse circuit 122 outputs a signal obtained by adding an influence of the synapse weight added to the received firing signal. A disabled synapse circuit 122 does not output a signal even through the disabled synapse circuit 122 receives the firing signal. The reservoir circuit 114 may include a plurality of such module circuits, and may also set a connection between modules.

The reservoir circuit 114 outputs M firing signals output from M neuron circuits 124 of the neuron circuits 124 as M time-series intermediate signals. The reservoir circuit 114 may optionally select, from among all the neuron circuits 124, the M neuron circuits 124 that output the M time-series intermediate signals.

The output circuit 116 includes the matrix operation device 90 and N voltage conversion circuits 132.

The matrix operation device 90 is the same as the circuit described in the fourth embodiment. The matrix operation device 90 receives the M time-series intermediate signals from the reservoir circuit 114 as the M input values. The matrix operation device 90 then outputs N multiply-accumulate currents ($I_{acc}$).

The N voltage conversion circuits 132 correspond to the N multiply-accumulate currents ($I_{acc}$) on a one-to-one basis. Each of the N voltage conversion circuits 132 converts a corresponding multiply-accumulate current ($I_{acc}$) of the N multiply-accumulate currents ($I_{acc}$) into a voltage signal and outputs a resultant voltage signal as the corresponding time-series inferential signal of the N time-series inferential signals.

The output circuit 116 can output the N time-series inferential signals. The output circuit 116 may include only some of the N voltage conversion circuits 132. In this case, the output circuit 116 outputs one or more time-series inferential signals that are less than N. In addition, the output circuit 116 may also binarize the time-series inferential signal and output a digital time-series inferential signal.

The learning control circuit 118 sets a synapse weight for the synapse circuits 122 included in the reservoir circuit 114 and a weight value for the M×N multiplication devices 10 included in the matrix operation device 90 during a learning process.

Figure 11:
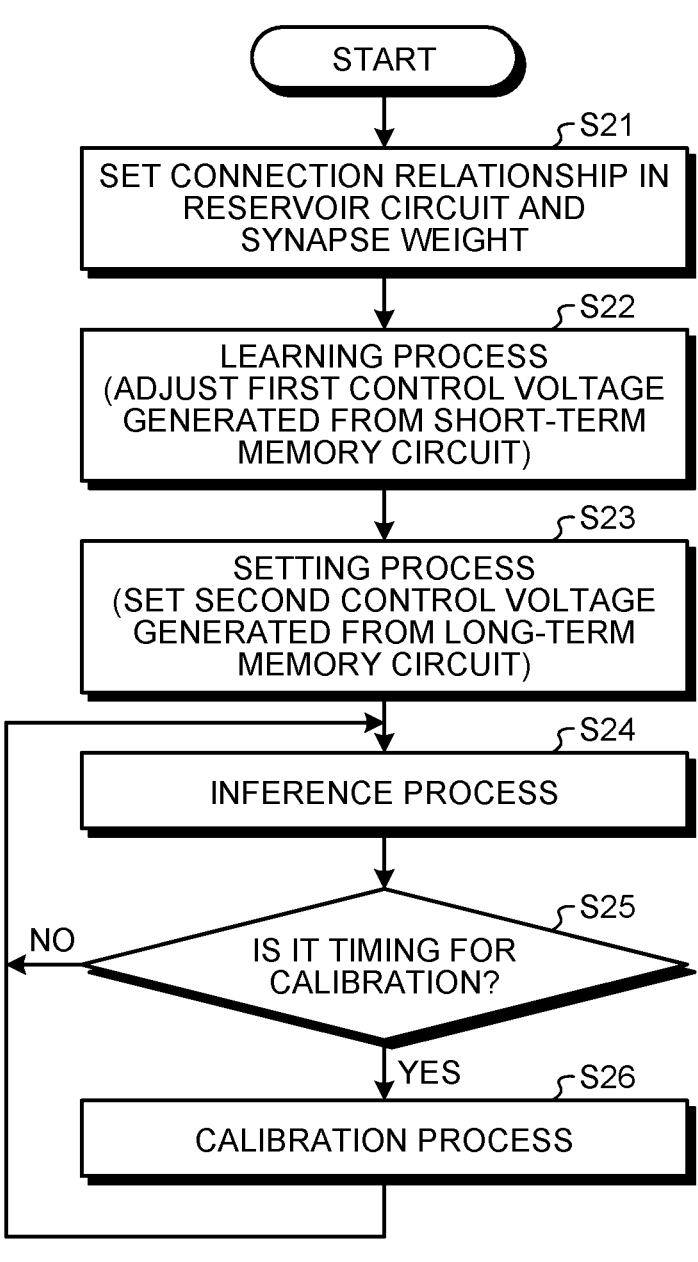
FIG. 11 is a flowchart illustrating a processing flow of the reservoir device.

FIG. 11 is a flowchart illustrating a processing flow of the reservoir device 110. The reservoir device 110 executes processing in the flow illustrated in FIG. 11.

First, at S21, the learning control circuit 118 sets a connection relationship of each of the synapse circuits 122 and each of the neuron circuits 124 in the reservoir circuit 114, and a plurality of the synapse weights. The learning control circuit 118 may set the connection relationship and the synapse weights based on information defined by a user or the like. The learning control circuit 118 may also randomly set the connection relationship and the synapse weights.

Subsequently, at S22, the learning control circuit 118 executes the learning process. In the learning process, the learning control circuit 118 provides, for example, a predetermined learning input signal to the input circuit 112 as the time-series input signal. Subsequently, the learning control circuit 118 compares a time-series inferential signal output from the output circuit 116 in response to the input of the learning input signal with a predetermined teacher signal. The learning control circuit 118 changes a weight value set for each of the M×N multiplication devices 10 included in the matrix operation device 90 so that the time-series inferential signal matches the teacher signal, for example.

In the learning process, the learning control circuit 118 causes the short-term memory circuit 12 in the M×N multiplication devices 10 included in the matrix operation device 90 to be charged with an electric charge or discharge an electric charge, to execute the adjustment process of adjusting the first control voltage ($V_{W1}$) generated by the short-term memory circuit 12. That is, in the learning process, the learning control circuit 118 causes each of the M×N multiplication devices 10 not to change the second control voltage ($V_{W2}$) generated by the long-term memory circuit 14. With this configuration, it is possible to update the weight value at high speed since the learning control circuit 118 causes the short-term memory circuit 12 with a relatively small time constant to be charged with an electric charge and discharge an electric charge for each of the M×N multiplication devices 10.

The learning control circuit 118 ends the learning process in a case where a weight value is set for each of the M×N multiplication devices 10 included in the matrix operation device 90 so that the time-series inferential signal matches the teacher signal. After the learning process, the learning control circuit 118 causes the process to proceed to S23.

At S23, the learning control circuit 118 executes the setting process for each of the M×N multiplication devices 10. That is, after the learning process, the learning control circuit 118 matches the second control voltage ($V_{W2}$) generated by the long-term memory circuit 14 with the first control voltage ($V_{W1}$) generated by the short-term memory circuit 12 in each of the M×N multiplication devices 10. With this configuration, by the learning control circuit 118, each of the M×N multiplication devices 10 can store the weight values with high precision for a long time. After the setting process, the learning control circuit 118 causes the process to proceed to S24.

At S24, the learning control circuit 118 causes the input circuit 112, the reservoir circuit 114, and the output circuit 116 to execute the inference process. That is, after the setting process, the learning control circuit 118 causes the time-series input signal to be input and the time-series inferential signal to be output.

Subsequently, at S25, the learning control circuit 118 determines whether it is timing for calibration. The calibration timing is, for example, every predetermined time interval or every time when a predetermined event occurs. In a case where the calibration timing has not been reached (No at S25), the learning control circuit 118 returns the process to S24 to continue the inferential process. In a case where the calibration timing is reached (Yes at S25), the learning control circuit 118 causes the process to proceed to S26.

At S26, the learning control circuit 118 executes the calibration process for each of the M×N multiplication devices 10. Specifically, the learning control circuit 118 instructs each of the M×N multiplication devices 10 so that the first control voltage ($V_{W1}$) generated by the short-term memory circuit 12 is matched with the second control voltage ($V_{W2}$) generated by the long-term memory circuit 14.

In the case where the process at S26 ends, the learning control circuit 118 returns the process to S24 to continue the inference process.

Accordingly, the learning and inference of the weight values are carried out by using the M×N multiplication devices 10. Therefore, the reservoir device 110 as described above can execute the multiply-accumulate operation process with a high resolution and high precision, with a very simple configuration.

In the learning process, the reservoir device 110 updates weights by causing the short-term memory circuit 12 included in each of the M×N multiplication devices 10 to be charged with an electric charge and discharge an electric charge. With this configuration, the reservoir device 110 can update the weight values at high speed and with high precision.

After the learning process ends, the reservoir device 110 causes the long-term memory circuit 14 included in each of the M×N multiplication devices 10 to store the weight values. With this configuration, the reservoir device 110 can carry out the storage of the weight values with high precision for a long time.

At the calibration timing, the reservoir device 110 causes each of the M×N multiplication devices 10 to execute the calibration process by transferring an electric charge from the long-term memory circuit 14 to the short-term memory circuit 12. With this configuration, the reservoir device 110 keeps causing the short-term memory circuit 12 to store the weight values with high precision for a long time.

As described above, the reservoir device 110 can update the weight values with high precision in a short time and can store the weight values with high precision for a long period of time. With this configuration, the reservoir device 110 can output the inferential signals with high precision for a long time.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiplication device outputting an output value obtained by multiplying an input value by a weight value, the multiplication device comprising:

a short-term memory circuit configured to hold an electric charge and generate a first control voltage in accordance with the weight value by the held electric charge;

a long-term memory circuit configured to generate a second control voltage in accordance with the weight value by a circuit with a larger time constant than a time constant of the short-term memory circuit;

a conversion circuit including an input terminal, an output terminal, and a control terminal, the conversion circuit being configured to change a conductance in accordance with a voltage applied to the control terminal and output, from the output terminal, a current obtained by multiplying a voltage applied to the input terminal by the conductance; and a control circuit, wherein the conversion circuit outputs, from the output terminal, an output current as the output value obtained by multiplying an input voltage by the conductance, the output current being output by that, the first control voltage generated by the short-term memory circuit is applied to the control terminal, and the input voltage according to the input value is applied to the input terminal, and the control circuit is configured to execute a calibration process of matching the first control voltage generated by the short-term memory circuit with the second control voltage generated by the long-term memory circuit, the calibration process being executed by transferring an electric charge from the long-term memory circuit to the short-term memory circuit.

2. The multiplication device according to claim 1, wherein the control circuit is configured to execute an adjustment process of storing, in the short-term memory circuit, an electric charge having an electric charge amount for generating the first control voltage according to the weight value by charging the short-term memory circuit with an electric charge or making the short-term memory circuit discharge the electric charge, and, after the adjustment process, execute a setting process of matching the second control voltage generated by the long-term memory circuit with the first control voltage generated by the short-term memory circuit.

3. The multiplication device according to claim 1, wherein the control circuit executes the calibration process at each predetermined time interval or each time when a predetermined event occurs.

4. The multiplication device according to claim 1, wherein the conversion circuit is a field-effect transistor.

5. The multiplication device according to claim 1, wherein the short-term memory circuit includes a capacitor.

6. The multiplication device according to claim 1, wherein the long-term memory circuit is configured to hold an electric charge by the circuit with the larger time constant than the time constant of the short-term memory circuit, and generate the second control voltage in accordance with the weight value by the held electric charge.

7. The multiplication device according to claim 6, wherein the long-term memory circuit includes a capacitor.

8. The multiplication device according to claim 6, wherein the long-term memory circuit includes an electric storage element.

9. The multiplication device according to claim 1, wherein the long-term memory circuit is a variable resistor.

10. A multiply-accumulate operation device outputting a multiply-accumulate operation value obtained by performing a multiply-accumulate operation on M input values, where M is an integer of equal to or greater than 2, and M weight values, the multiply-accumulate operation device comprising:

M multiplication devices corresponding to the M weight values;

an output line; and a control circuit, wherein an m-th multiplication device, where m is an integer of 1 through M, both inclusive, of the M multiplication devices is configured to output an output value obtained by multiplying an m-th input value of the M input values by an m-th weight value of the M weight values, the m-th multiplication device includes a short-term memory circuit configured to hold an electric charge and generate a first control voltage in accordance with the m-th weight value by the held electric charge, a long-term memory circuit configured to generate a second control voltage in accordance with the m-th weight value by a circuit with a larger time constant than a time constant of the short-term memory circuit, and a conversion circuit including an input terminal, an output terminal, and a control terminal, the conversion circuit being configured to change a conductance in accordance with a voltage applied to the control terminal and output, from the output terminal, a current obtained by multiplying a voltage applied to the input terminal by the conductance, the conversion circuit outputs, from the output terminal to the output line, an output current according to the output value, the output current being output by that, the first control voltage generated by the short-term memory circuit is applied to the control terminal, and an input voltage according to the m-th input value is applied to the input terminal, the output line is configured to output, as the multiply-accumulate operation value, a multiply-accumulate current obtained by adding up the output currents output from the M multiplication devices, and the control circuit is configured to execute, for each of the M multiplication devices, a calibration process of matching the first control voltage generated by the short-term memory circuit with the second control voltage generated by the long-term memory circuit.

11. The multiply-accumulate operation device according to claim 10, wherein the m-th multiplication device further includes a rectifier circuit configured to allow the output current to flow from the output terminal in a predetermined first direction and block a current flowing in a direction opposite to the first direction.

12. A matrix operation device outputting N-column multiply-accumulate operation values, where N is an integer of equal to or greater than 1, obtained by performing a matrix operation on M-column input values, where M is an integer of equal to or greater than 2, and M-row×N-column weight values, the matrix operation device comprising:

M×N multiplication devices corresponding to the M-row×N-column weight values;

N output lines corresponding to the N-column multiply-accumulate operation values; and a control circuit, wherein a multiplication device of the M×N multiplication devices, which corresponds to an n-th column, where n is an integer of 1 through N, both inclusive, in an m-th row, where m is an integer of 1 through M, both inclusive, is configured to output an output value obtained by multiplying an m-th column input value of the M-column input values by a weight value of an n-th column in an m-th row of the M-row×N-column weight values, the multiplication device corresponding to the n-th column in the m-th row includes a short-term memory circuit configured to hold an electric charge and generate a first control voltage in accordance with the weight value of the n-th column in the m-th row by the held electric charge, a long-term memory circuit configured to generate a second control voltage in accordance with the weight value of the n-th column in the m-th row by a circuit with a larger time constant than a time constant of the short-term memory circuit, and a conversion circuit including an input terminal, an output terminal, and a control terminal, the conversion circuit being configured to change a conductance in accordance with a voltage applied to the control terminal and output, from the output terminal, a current obtained by multiplying a voltage applied to the input terminal by the conductance, the conversion circuit outputs, from the output terminal to an n-th output line of the N output lines, an output current according to an output value, the output current being output by that, the first control voltage generated by the short-term memory circuit is applied to the control terminal, and an input voltage according to the m-th column input value of the M-column input values is applied to the input terminal, the n-th output line is configured to output a multiply-accumulate current obtained by adding up the output currents output from M multiplication devices corresponding to an n-th column of the M×N multiplication devices, the multiply-accumulate current being output as an n-th column multiply-accumulate operation value of the N-column multiply-accumulate operation values, and the control circuit is configured to execute, for each of the M×N multiplication devices, a calibration process of matching the first control voltage generated by the short-term memory circuit with the second control voltage generated by the long-term memory circuit.

13. The matrix operation device according to claim 12, wherein the multiplication device corresponding to the n-th column in the m-th row further includes a rectifier circuit configured to allow the output current to flow from the output terminal in a predetermined first direction and block a current flowing in a direction opposite to the first direction.

14. A reservoir device including the matrix operation device according to claim 13, the reservoir device receiving a time-series input signal and outputting one or more time-series inferential signals, the reservoir device comprising:

an input circuit configured to output a time-series preprocessing signal according to the time-series input signal;

a reservoir circuit configured to receive the time-series preprocessing signal and output M time-series intermediate signals, the reservoir device serving as a recurrent neural network; and an output circuit configured to receive the M time-series intermediate signals and output a time-series inferential signal, wherein the output circuit includes the matrix operation device and a voltage conversion circuit, the matrix operation device receives the M time-series intermediate signals as the M input values and outputs N multiply-accumulate currents, and the voltage conversion circuit is configured to convert a predetermined multiply-accumulate current of the N multiply-accumulate currents into a voltage signal and output a resultant voltage signal as the time-series inferential signal.

15. The reservoir device according to claim 14, wherein the reservoir circuit includes a plurality of synapse circuits and a plurality of neuron circuits, each synapse circuit in the plurality of synapse circuits is given a synapse weight and configured to receive a firing signal from one neuron circuit in the plurality of neuron circuits and supply, to one neuron circuit in the plurality of neuron circuits, a signal obtained by adding an influence of the synapse weight to the received firing signal, each neuron circuit in the plurality of the neuron circuits is configured to output the firing signal in accordance with a cumulative value of received signals, and the firing signal output from at least one neuron circuit in the plurality of neuron circuits is fed back to the one neuron circuit through one or more synapse circuits in the plurality of synapse circuits.

16. The reservoir device according to claim 15, further comprising a learning control circuit configured to, in a learning process, supply a predetermined learning input signal to the input circuit as the time-series input signal, compare the time-series inferential signal with a teacher signal, update the weight value given to each of the M×N multiplication devices, and cause each of the M×N multiplication devices to adjust the first control voltage generated by the short-term memory circuit, after the learning process, execute a setting process of matching the second control voltage generated by the long-term memory circuit with the first control voltage generated by the short-term memory circuit for each of the M×N multiplication devices, after the setting process, execute an inference process of inputting the time-series input signal and outputting the time-series inferential signal, and after end of the learning process, execute the calibration process at each predetermined time interval or every time when a predetermined event occurs.

17. The reservoir device according to claim 16, wherein, before the learning process, the learning control circuit randomly sets the synapse weight for each synapse circuit in the plurality of synapse circuits and randomly sets connection relationship between the plurality of synapse circuits and the plurality of neuron circuits.

* * * * *